(12) United States Patent
Abotabl et al.

(10) Patent No.: US 11,627,574 B2
(45) Date of Patent: Apr. 11, 2023

(54) GROUPING USER EQUIPMENT BASED ON DOWNLINK POWER

(71) Applicant: QUALCOMM Incorporated, San Diego, CA (US)

(72) Inventors: Ahmed Attia Abotabl, San Diego, CA (US); Muhammad Sayed Khairy Abdelghaffar, San Jose, CA (US); Shimman Arvind Patel, San Diego, CA (US); Wanshi Chen, San Diego, CA (US); Huilin Xu, Temecula, CA (US); Hwan Joon Kwon, San Diego, CA (US); Krishna Kiran Mukkavilli, San Diego, CA (US); Tingfang Ji, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 30 days.

(21) Appl. No.: 17/332,859

(22) Filed: May 27, 2021

(65) Prior Publication Data

US 2021/0385814 A1 Dec. 9, 2021

Related U.S. Application Data

(60) Provisional application No. 63/036,979, filed on Jun. 9, 2020.

(51) Int. Cl.
*H04W 72/04* (2009.01)
*H04W 72/0453* (2023.01)
*H04W 52/34* (2009.01)

(52) U.S. Cl.
CPC ....... *H04W 72/0453* (2013.01); *H04W 52/34* (2013.01)

(58) Field of Classification Search
CPC ............ H04W 72/0453; H04W 52/34; H04W 52/283; H04W 52/242; H04W 72/042; H04W 52/143
See application file for complete search history.

(56) References Cited

U.S. PATENT DOCUMENTS 10,111,255 B2    10/2018   Islam et al.
10,219,279 B2    2/2019   Baghel et al.
(Continued)

FOREIGN PATENT DOCUMENTS

EP          3038280 A1    6/2016
WO     2017157461 A1    9/2017

OTHER PUBLICATIONS

Co-pending U.S. Appl. No. 17/332,843, inventor Abotabl; Ahmed, filed May 27, 2021.
(Continued)

*Primary Examiner* — Christine Ng
(74) *Attorney, Agent, or Firm* — Shumaker & Sieffert, P. A. / Qualcomm

(57) ABSTRACT

Aspects of the disclosure relate to downlink (DL) transmissions using various powers and assigning frequency resources based on the powers. An example base station may transmit, to a first user equipment (UE), an indication of a first transmit (Tx) power for a first DL transmission on a first downlink (DL) resource on a carrier, the first DL resource being at a first frequency. The first DL resource may be at a first frequency. The first Tx power may have a power level configured based on a difference between the first frequency for the first DL resource and an uplink (UL) frequency region of the carrier. Then, the base station may transmit the first DL transmission using the first frequency and the first Tx power. Other aspects, embodiments, and features are also claimed and described.

30 Claims, 23 Drawing Sheets

(56) References Cited

U.S. PATENT DOCUMENTS

| | | |
|---|---|---|
| 10,231,132 B2 | 3/2019 | Zhang et al. |
| 10,673,586 B2 | 6/2020 | Chen et al. |
| 11,304,213 B2 | 4/2022 | Raghothaman et al. |
| 2007/0265757 A1* | 11/2007 | Kawasaki ............. H04W 52/04 701/51 |
| 2013/0017687 A1 | 1/2013 | Lin et al. |
| 2013/0084913 A1 | 4/2013 | Gaal et al. |
| 2015/0163730 A1* | 6/2015 | Zhang ................... H04W 48/12 370/329 |
| 2015/0358995 A1* | 12/2015 | Li ......................... H04W 74/06 370/329 |
| 2016/0164496 A1* | 6/2016 | Leyh ................. H04B 7/18506 455/114.2 |
| 2017/0086224 A1 | 3/2017 | Wilhelmsson et al. |
| 2017/0238261 A1 | 8/2017 | Benjebbour et al. |
| 2017/0290014 A1 | 10/2017 | Kim et al. |
| 2018/0098291 A1* | 4/2018 | Fodor ................. H04W 52/346 |
| 2020/0053723 A1 | 2/2020 | Hosseini et al. |
| 2020/0178259 A1 | 6/2020 | Pan et al. |
| 2021/0282028 A1 | 9/2021 | Takano |
| 2021/0385793 A1 | 12/2021 | Abotabl et al. |
| 2022/0159587 A1 | 5/2022 | Park et al. |
| 2022/0191725 A1 | 6/2022 | Ashraf et al. |

OTHER PUBLICATIONS

International Search Report and Written Opinion—PCT/US2021/034964—ISA/EPO—dated Sep. 22, 2021.

Oghenekome O., et al., "Advanced Power Control Techniques for Interference Mitigation in Dense 802.11 Networks", 2013 16th International Symposium on Wireless Personal Multimedia Communications (WPMC), NICT, Jun. 24, 2013 (Jun. 24, 2013), pp. 1-7, XP032493927, ISSN: 1347-6890 [Retrieved on Oct. 2, 2013] sections II, III.

Co-pending U.S. Appl. No. 17/332,859, inventor Abotabl; Ahmed, filed May 27, 2021.

Non-Final Office Action dated Sep. 20, 2022 for U.S. Appl. No. 17/322,843, 7 pp.

Response to Non-Final Office Action filed Nov. 21, 2022 for U.S. Appl. No. 17/332,843, 13 pp.

* cited by examiner

GROUPING USER EQUIPMENT BASED ON DOWNLINK POWER

PRIORITY CLAIM

This application claims priority to and the benefit of provisional patent application No. 63/036,979 filed in the United States Patent and Trademark Office on Jun. 9, 2020, the entire content of which is incorporated herein by reference as if fully set forth below in its entirety and for all applicable purposes. This application is related to co-pending non-provisional application Ser. No. 17/332,843, filed in the United States Patent and Trademark Office on May 27, 2021, the entire contents of which are incorporated herein by reference as if fully set forth below in their entirety and for all applicable purposes.

TECHNICAL FIELD

This disclosure relates generally to wireless communications and, more specifically, to broadcast transmissions employing coverage enhancement techniques.

INTRODUCTION

Wireless communication systems are widely deployed to provide various types of communication content such as voice, video, packet data, messaging, broadcast, and so on. A wireless multiple-access communication system may include a number of base stations or access network nodes, each simultaneously supporting communication for multiple communication devices, which may be otherwise known as user equipment (UE). A base station may transmit with a given transmission power level, the various types of communication content to a plurality of UEs.

As the demand for mobile broadband access continues to increase, research and development continue to advance wireless communication technologies not only to meet the growing demand for mobile broadband access, but to advance and enhance the user experience with mobile communications.

BRIEF SUMMARY OF SOME EXAMPLES

The systems, methods and devices of this disclosure each have several innovative aspects, no single one of which is solely responsible for the desirable attributes disclosed herein.

Various aspects of the present disclosure provides for assigning a transmit (Tx) power for a given DL resource assignment based on a frequency of the resource assignment. In some examples, the base station may assign a Tx power for a given DL resource assignment based on a frequency separation of a frequency of the resource assignment, and a UL frequency region (e.g., active UL BWP, PUSCH, etc.) of a carrier. Thus, the base station 2302 may reduce interference to or from UL communications that use the UL frequency region, by assigning a higher Tx power for DL transmissions that are farther in frequency from the UL frequency region, and a lower Tx power for DL transmissions that are closer in frequency from the UL frequency region.

In some aspects, the disclosure provides a method, apparatus, and computer readable medium having code for implementing wireless communication utilizing an algorithm for assigning a Tx power for a given DL resource assignment based on a frequency separation of a frequency of the resource assignment and a UL frequency region of a carrier. Here, a base station may transmit, to a first user equipment (UE), an indication of a first transmit (Tx) power for a first downlink (DL) transmission on a first DL resource on a carrier. The first DL resource may be at a first frequency. The first Tx power may have a power level configured based on a difference between the first frequency for the first DL resource and an uplink (UL) frequency region of the carrier. The base station may, then, transmit the first DL transmission using the first frequency and the first Tx power.

These and other aspects of the technology discussed herein will become more fully understood upon a review of the detailed description, which follows. Other aspects, features, and embodiments will become apparent to those of ordinary skill in the art, upon reviewing the following description of specific, exemplary embodiments in conjunction with the accompanying figures. While the following description may discuss various advantages and features relative to certain embodiments and figures, all embodiments can include one or more of the advantageous features discussed herein. In other words, while this description may discuss one or more embodiments as having certain advantageous features, one or more of such features may also be used in accordance with the various embodiments discussed herein. In similar fashion, while this description may discuss exemplary embodiments as device, system, or method embodiments, it should be understood that such exemplary embodiments can be implemented in various devices, systems, and methods.

BRIEF DESCRIPTION OF THE DRAWINGS

Details of one or more implementations of the subject matter described in this disclosure are set forth in the accompanying drawings and the description below. Other features, aspects, and advantages will become apparent from the description, the drawings and the claims. Note that the relative dimensions of the following figures may not be drawn to scale.

Like reference numbers and designations in the various drawings indicate like elements.

DETAILED DESCRIPTION

Figure 1:
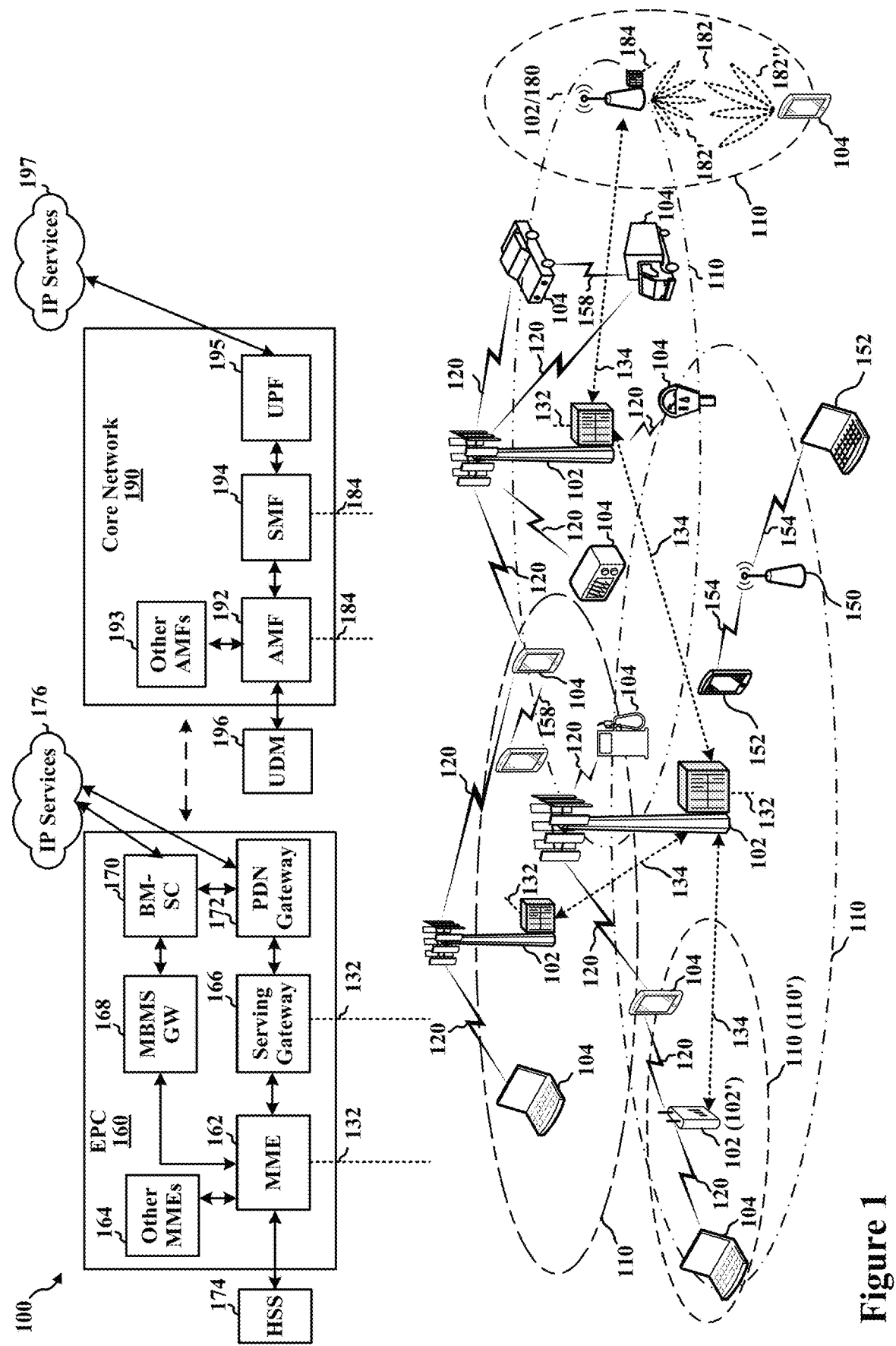
FIG. 1 shows a diagram illustrating a wireless communication system according to some embodiments.

The following description is directed to some particular implementations for the purposes of describing innovative aspects of this disclosure. However, a person having ordinary skill in the art will readily recognize that the teachings herein can be applied in a multitude of different ways. The described implementations can be implemented in any device, system or network that is capable of transmitting and receiving radio frequency (RF) signals according to one or more of the Long Term Evolution (LTE), 3G, 4G or 5G (New Radio (NR)) standards promulgated by the 3rd Generation Partnership Project (3GPP), the Institute of Electrical and Electronics Engineers (IEEE) 802.11 standards, the IEEE 802.15 standards, or the Bluetooth® standards as defined by the Bluetooth Special Interest Group (SIG), among others. The described implementations can be implemented in any device, system or network that is capable of transmitting and receiving RF signals according to one or more of the following technologies or techniques: code division multiple access (CDMA), time division multiple access (TDMA), frequency division multiple access (FDMA), orthogonal FDMA (OFDMA), single-carrier FDMA (SC-FDMA), single-user (SU) multiple-input multiple-output (MIMO) and multi-user (MU) MIMO. The described implementations also can be implemented using other wireless communication protocols or RF signals suitable for use in one or more of a wireless wide area network (WWAN), a wireless personal area network (WPAN), a wireless local area network (WLAN), or an internet of things (IOT) network.

Base stations operating within a radio access network (RAN) may include a plurality of antennas that allow for the simultaneous transmission of downlink (DL) data to multiple UEs, and for the simultaneous reception of uplink (UL) data from multiple UEs. These base stations can also transmit DL data to multiple UEs concurrently with the reception of UL data from multiple UEs. When the frequencies of the DL and UL channels are the same or close to each other, DL and UL transmissions may interfere with one another. Although reducing the overall transmit power of DL transmissions may reduce levels of interference on the UL channels, the quality and range of the DL transmissions may also be reduced.

Various implementations disclosed herein may be used to reduce interference on UL transmissions resulting from concurrent DL transmissions from a wireless communication device such as a base station. In some implementations, a base station may transmit one or more reference signals a plurality of UEs on a DL channel Each of the UEs may measure a power level, channel state information (CSI), or a link quality of the DL channel based on the reference signals, and report the measured power level, CSI, or link quality to the base station. The base station may use one or more of the measured power levels, CSIs, or link qualities reported by the UEs to logically divide a number of UEs within its coverage or service area into a plurality of groups of UEs. The base station may also use one or more of the measured power levels, CSIs, or link qualities reported by the UEs to determine a transmit power gradient for transmitting DL data to different groups of UEs using different DL transmit power levels. The base station may associate each of the different DL transmit power levels of the transmit power gradient with a respective group of UEs, and use the transmit power gradient for DL transmissions to UEs belonging to different groups. That is, the base station may transmit DL data to each group of UEs using the different DL transmit power level associated with the respective group of UEs.

In some implementations, the transmit power gradient may include DL transmit power levels configured to reduce inter-channel interference (ICI) on one or more UL channels resulting from energy associated with concurrent DL transmissions from a base station, without diminishing the ability of UEs in the coverage or service area of the base station to receive the concurrent DL transmissions. For example, UEs located closer to the base station may be able to receive and successfully decode DL data at lower DL transmit power levels than UEs located further from the base station, and thus the UEs located closer to the base station may be grouped together in a first group of UEs and associated with a first DL transmit power level, and the UEs located further from the base station may be grouped together in a second group of UEs and associated with a second DL transmit power level that is greater than the first DL transmit power level. In some instances, the second DL transmit power level may be a configured transmit power level (such as a transmit power level specified by one or more releases of the 3GPP), and the first DL transmit power level may be a reduced transmit power level relative to the configured transmit power level. In some other instances, the first DL transmit power level may be a configured transmit power level, and the second DL transmit power level may be an increased transmit power level relative to the configured transmit power level.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example implementations, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can include a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 shows a diagram of an example wireless communications system 100. The wireless communications system 100, which may be a Next Generation RAN (NG-RAN), includes base stations 102, UEs 104, an Evolved Packet Core (EPC) 160, and another core network 190. The base stations 102 may include macrocells (high power cellular base station) or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-U IRAN)) may interface with the EPC 160 through backhaul links 132 via S1 interfaces, and the base stations 102 configured for 5G NR may interface with the core network 190 through backhaul links 184 via N2 and N3 interfaces. The base stations 102 may communicate with one another through one or more backhaul links 134 via X2 interfaces. The base stations 102 may perform a number of functions including (but not limited to) the transfer of user data, radio channel ciphering and deciphering, integrity protection, header compression, mobility control functions (such as handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages.

Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network also may include Home Evolved Node Bs (eNBs) (HeNBs), which may provide service to a restricted group known as a closed subscriber group (CSG).

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as base stations 105 and UEs 404 may employ carrier sensing for collision detection and avoidance. In some cases, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, D2D transmissions, or the like.

The wireless communications system may further include a Wi-Fi access point (AP) 150 in communication with Wi-Fi stations (STAs) 152 via communication links 154 in a 2.4

GHz unlicensed frequency spectrum, a 5 GHz unlicensed frequency spectrum, or both. When communicating in an unlicensed frequency spectrum, the STAs 152 and the AP 150 may perform a clear channel assessment (CCA) prior to communicating in order to determine whether the channel is available.

A given base station 102 may also be referred to as a gNB, Node B, evolved Node B (eNB), an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or the core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (such as an MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some UEs 104 may be referred to as IoT devices (such as a parking meter, gas pump, toaster, vehicles, heart monitor, etc.). Other UEs 104 may be referred to as cellular IoT (CIoT) devices (such as a smartphone capable of narrowband communications based on one or more designed for IoT devices). A UE 104 also may be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

A base station 102, whether a small cell 102' or a large cell (such as a macro base station), may include an eNB, gNodeB (gNB), or another type of base station. Some base stations, such as gNB 180, may operate in a traditional sub-6 GHz spectrum, in millimeter wave (mmW) frequencies, or near mmW frequencies in communication with the UE 104. When the gNB 180 operates in mmW or near mmW frequencies, the gNB 180 may be referred to as a millimeter wave or mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave.

Communications using the mmW or near mmW radio frequency band (such as between 3 GHz-300 GHz) has extremely high path loss and a short range. The mmW base station 180 may utilize beamforming 182 with the UE 104 to compensate for the extremely high path loss and short range. Beamforming, which may also be referred to as spatial filtering, directional transmission, or directional reception, is a signal processing technique that may be used at a transmitting device or a receiving device (such as a base station 102 or a UE 104) to shape or steer an antenna beam along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying certain amplitude offsets, phase offsets, or both to signals carried via the antenna elements associated with the device. The adjustments associated with each of the antenna elements may be defined by a beamforming weight set associated with a particular orientation (such as with respect to the antenna array of the transmitting device or receiving device, or with respect to some other orientation).

For example, the base station 180 may transmit a beamformed signal to the UE 104 in one or more transmit directions 182'. The UE 104 may receive the beamformed signal from the base station 180 in one or more receive directions 182". The UE 104 also may transmit a beamformed signal to the base station 180 in one or more transmit directions. The base station 180 may receive the beamformed signal from the UE 104 in one or more receive directions. The base station 180 and UE 104 may perform beam training to determine the best receive and transmit directions for each of the base station 180 and UE 104. The transmit and receive directions for the base station 180 may or may not be the same. The transmit and receive directions for the UE 104 may or may not be the same.

The base stations 102 and the UEs 104 may wirelessly communicate with each other via one or more communication links 120 using one or more carriers. The term "carrier" may refer to a set of radio frequency spectrum resources having a defined physical layer structure for supporting the communication links 120. For example, a carrier used for a communication link 120 may include a portion of a radio frequency spectrum band (such as a bandwidth part (BWP)) that is operated according to physical layer channels for a given radio access technology. Each physical layer channel may carry acquisition signaling (such as synchronization signals, system information), control signaling that coordinates operation for the carrier, user data, or other signaling. The wireless communications system 100 may support communications between the base station 102 and the UEs 104 using carrier aggregation or multi-carrier operation. Carrier aggregation may be used with both frequency division duplexing (FDD) and time division duplexing (TDD) component carriers. Allocation of carriers may be asymmetric with respect to the DL and UL channels, for example such that the UL and DL channels may include different numbers of carriers. The component carriers may include a primary component carrier and one or more secondary component carriers. A primary component carrier may be referred to as a primary cell (PCell), and a secondary component carrier may be referred to as a secondary cell (SCell).

In some examples, a carrier may support multiple cells, and different cells may be configured according to different protocol types (such as MTC, NB-IoT, enhanced mobile broadband (eMBB), or others) that may provide access for different types of devices.

The communication links 120 may include uplink (UL) transmissions from a UE 104 to a base station 102 or downlink (DL) transmissions from a base station 102 to a UE 104. The communication links 120 may use multiple-input and multiple-output (MIMO) antenna technology, for example, to provide spatial multiplexing, beamforming, or transmit diversity. The base stations 102 and UEs 104 may use spectrum up to Y MHz (such as 5 MHz, 10 MHz, 15 MHz, 20 MHz, 100 MHz, 400 MHz, etc.) bandwidth per carrier allocated in a carrier aggregation of up to a total of Yx MHz (x component carriers) used for transmission in each direction. The carriers may or may not be adjacent to each other.

Some UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

Some UEs 104, such as MTC or IoT devices, may be low cost or low complexity devices and may provide for automated communication between machines (such as by using Machine-to-Machine (M2M) communication). M2M communication or MTC may refer to data communication technologies that allow devices to communicate with one another or a base station 102 without human intervention. In some examples, M2M communication or MTC may include communications from devices that integrate sensors or meters to measure or capture information and relay such information to a central server or application program that makes use of the information or presents the information to humans interacting with the application program. Some UEs 104 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the RRC protocol layer may provide establishment, configuration, and maintenance of an RRC connection between a UE 104 and a base station 102 or EPC 160 supporting radio bearers for user plane data. At the Physical layer, transport channels may be mapped to physical channels.

The EPC 160 may provide user authentication, access authorization, tracking, Internet Protocol (IP) connectivity, and other access, routing, or mobility functions. In some implementations, the EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 is a control plane entity that manages access and mobility, and may be in communication with a Home Subscriber Server (HSS) 174. The MME 162 may manage non-access stratum (NAS) functions such as mobility, authentication, and bearer management for UEs 104 served by base stations 104 associated with the EPC 160, and may process the signaling between the UEs 104 and the EPC 160. All user IP packets are transferred through the Serving Gateway 166, which is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting MBMS related charging information.

The core network 190 may include an Access and Mobility Management Function (AMF) 192, one or more other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. User IP packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a PS Streaming Service, or other IP services.

Figure 2:
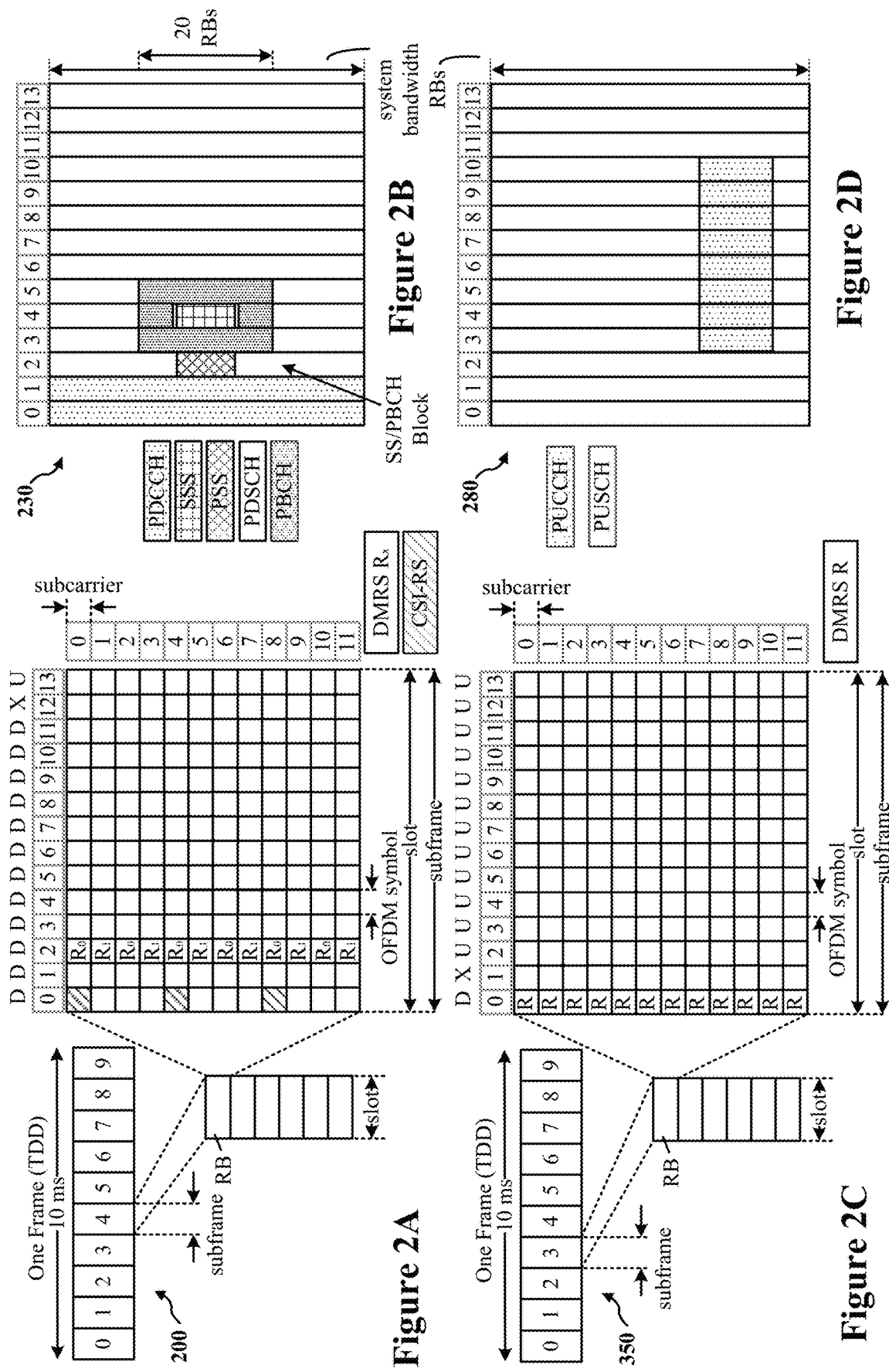
FIG. 2A shows an example of a first 5G New Radio (NR) frame according to some embodiments.
FIG. 2B shows example downlink (DL) channels within a 5G NR slot according to some embodiments.
FIG. 2C shows an example of a second 5G NR frame according to some embodiments.
FIG. 2D shows example uplink (UL) channels within a 5G NR slot according to some embodiments.

FIG. 2A shows an example of a first slot 200 within a 5G NR frame structure. FIG. 2B shows an example of DL channels 230 within a 5G NR slot. FIG. 2C shows an example of a second slot 250 within a 5G NR frame structure. FIG. 2D shows an example of UL channels 280 within a 5G NR slot. In some instances, the 5G NR frame structure may be FDD in which, for a particular set of subcarriers (carrier system bandwidth), slots within the set of subcarriers are dedicated for either DL or UL transmissions. In some other instances, the 5G NR frame structure may be TDD in which, for a particular set of subcarriers (carrier system bandwidth), slots within the set of subcarriers are dedicated for both DL and UL transmissions. In the examples shown in FIGS. 2A and 2C, the 5G NR frame structure is based on TDD, with slot 4 configured with slot format 28 (with mostly DL), where D indicates DL, U indicates UL, and X indicates that the slot is flexible for use between DL and UL, and with slot 3 configured with slot format 34 (with mostly UL). While slots 3 and 4 are shown with slot formats 34 and 28, respectively, any particular slot may be configured with any of the various available slot formats 0-61. Slot formats 0 and 1 are all DL and all UL, respectively. Other slot formats 2-61 include a mix of DL, UL, and flexible symbols. UEs may be configured with the slot format, either dynamically through downlink control information (DCI) or semi-statically through radio resource control (RRC) signaling by a slot format indicator (SFI). The configured slot format also may apply to a 5G NR frame structure that is based on FDD.

Other wireless communication technologies may have a different frame structure or different channels. A frame may be divided into a number of equally sized subframes. For example, a frame having a duration of 10 milliseconds (ms)

may be divided into 10 equally sized subframes each having a duration of 1 ms. Each subframe may include one or more time slots. Subframes also may include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on DL may be cyclic prefix (CP) OFDM (CP-OFDM) symbols. The symbols on UL may be CP-OFDM symbols (such as for high throughput scenarios) or discrete Fourier transform (DFT) spread OFDM (DFT-s-OFDM) symbols (also referred to as single carrier frequency-division multiple access (SC-FDMA) symbols) (such as for power limited scenarios).

The number of slots within a subframe is based on the slot configuration and the numerology. For slot configuration 0, different numerologies (μ) 0 to 5 allow for 1, 2, 4, 8, 16, and 32 slots, respectively, per subframe. For slot configuration 1, different numerologies 0 to 2 allow for 2, 4, and 8 slots, respectively, per subframe. Accordingly, for slot configuration 0 and numerology μ, there are 14 symbols per slot and 2μ slots per subframe. The subcarrier spacing and symbol length/duration are a function of the numerology. The subcarrier spacing may be equal to $2^{\mu}*15$ kHz, where μ is the numerology 0 to 5. As such, the numerology μ=0 has a subcarrier spacing of 15 kHz, and the numerology μ=5 has a subcarrier spacing of 480 kHz. The symbol length/duration is inversely related to the subcarrier spacing. FIGS. 2A-2D provide an example of slot configuration 0 with 14 symbols per slot and numerology μ=0 with 1 slot per subframe. The subcarrier spacing is 15 kHz and symbol duration is approximately 66.7 microseconds (μs).

A resource grid may be used to represent the frame structure. Each time slot includes a resource block (RB) (also referred to as a physical RB (PRB)) that extends across 12 consecutive subcarriers and across a number of symbols. The intersections of subcarriers and across 14 symbols. The intersections of subcarriers and of the RB define multiple resource elements (REs). The number of bits carried by each RE depends on the modulation scheme.

As illustrated in FIG. 2A, some of the REs carry a reference signal (RS) for the UE. In some configurations, one or more REs may carry a demodulation reference signal (DM-RS) (indicated as Rx for one particular configuration, where 100x is the port number, but other DM-RS configurations are possible). In some configurations, one or more REs may carry a channel state information reference signal (CSI-RS) for channel measurement at the UE. The REs also may include a beam measurement reference signal (BRS), a beam refinement reference signal (BRRS), and a phase tracking reference signal (PT-RS).

FIG. 2B illustrates an example of various DL channels within a subframe of a frame. The physical downlink control channel (PDCCH) carries DCI within one or more control channel elements (CCEs), each CCE including nine RE groups (REGs), each REG including four consecutive REs in an OFDM symbol. A primary synchronization signal (PSS) may be within symbol 2 of particular subframes of a frame. The PSS is used by a UE 104 to determine subframe or symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block (SSB). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. Although not shown, the UE may transmit sounding reference signals (SRS). The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), or UCI.

Figure 3:
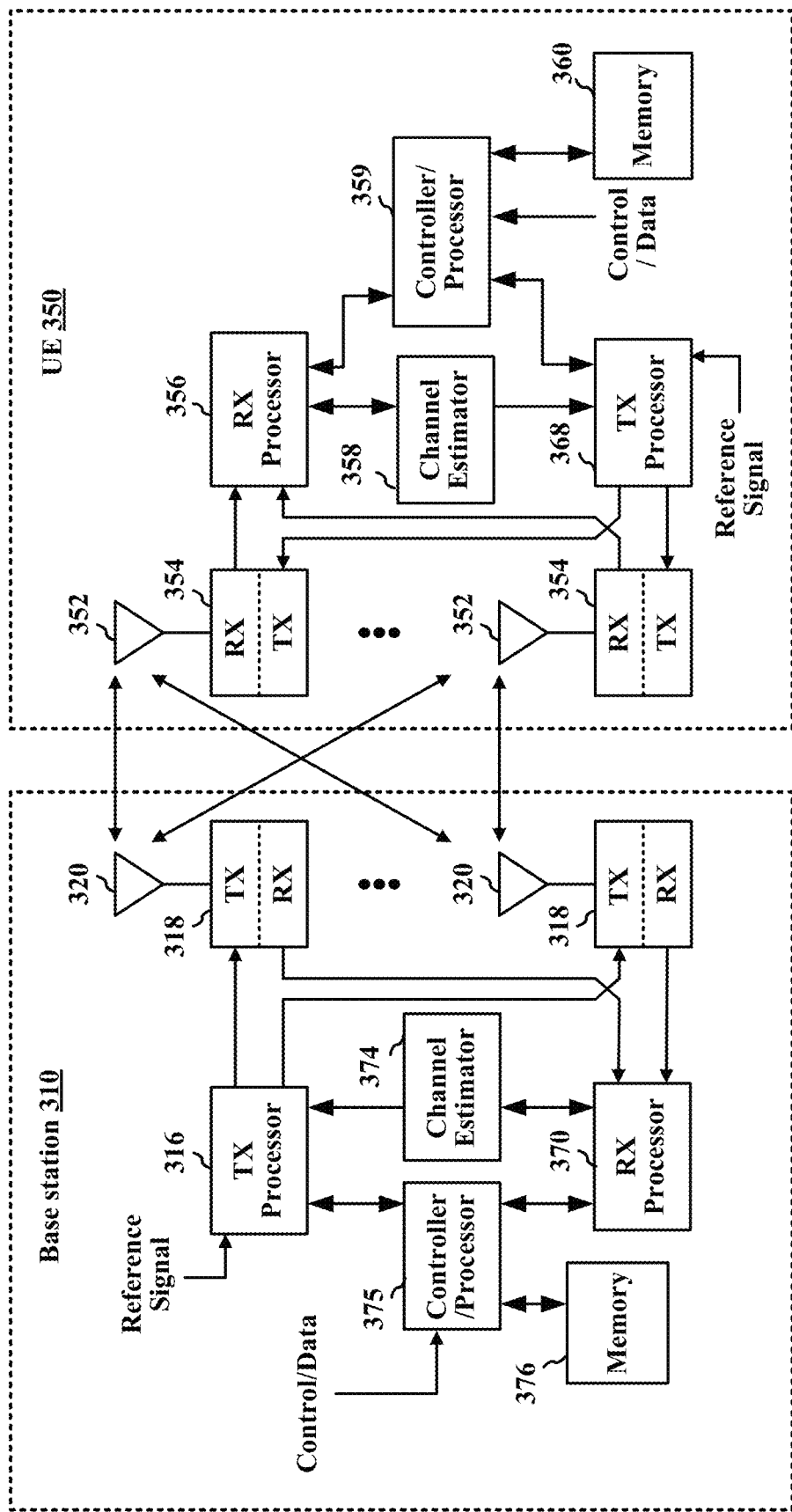
FIG. 3 shows a diagram illustrating an example base station and user equipment (UE) in an access network according to some embodiments.

FIG. 3 shows a block diagram of an example base station 310 and UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (such as the MIB and SIBs), RRC connection control (such as RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC)

coding/decoding of the transport channels, interleaving, rate matching, mapping onto physical channels, modulation/demodulation of physical channels, and MIMO antenna processing. The TX processor 316 handles mapping to signal constellations based on various modulation schemes (such as binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (such as a pilot signal) in the time or frequency domain, and then combined together using an Inverse Fast Fourier Transform (IFFT) to produce a physical channel carrying a time domain OFDM symbol stream. The OFDM stream is spatially pre-coded to produce multiple spatial streams Channel estimates from a channel estimator 374 may be used to determine the coding and modulation scheme, as well as for spatial processing. The channel estimate may be derived from a reference signal or channel condition feedback transmitted by the UE 350. Each spatial stream may then be provided to a different antenna 320 via a separate transmitter 318TX. Each transmitter 318TX may modulate an RF carrier with a respective spatial stream for transmission.

At the UE 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal includes a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK or NACK protocol to support HARQ operations.

Similar to the functionality described in connection with the DL transmission by the base station 310, the controller/processor 359 provides RRC layer functionality associated with system information (such as the MIB and SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK or NACK protocol to support HARQ operations. Information to be wirelessly communicated (such as for LTE or NR based communications) is encoded and mapped, at the PHY layer, to one or more wireless channels for transmission.

In the example of FIG. 3, each antenna 352 of the UE 350 is coupled to a respective transmitter 354TX. However, in some other implementations, the UE 350 may include fewer transmitters (or transmit chains) than receive (RX) antennas. Although not shown for simplicity, each transmitter may be coupled to a respective power amplifier (PA) which amplifies the signal to be transmitted. The combination of a transmitter and a PA may be referred to herein as a "transmit chain" or "TX chain." To save on cost or die area, the same PA may be reused to transmit signals over multiple RX antennas. In other words, one or more TX chains of a UE may be selectively coupled to multiple RX antennas ports.

As mentioned above, a base station may transmit DL data to multiple UEs concurrently with the reception of UL data from multiple UEs, and energy associated with the transmission of DL data can interfere with the reception of UL data by the base station. Inter-channel interference from DL channels to UL channels may also degrade the quality and range of UL transmissions to a base station. In accordance with various aspects of the present disclosure, a base station may receive power levels, channel state information (CSI), or link qualities measured by any number of UEs within its coverage or service area, and may use one or more of the measured power levels, CSIs, or link qualities reported by the UEs to logically divide a number of UEs within its coverage or service area into a plurality of groups of UEs. The base station may also use one or more of the measured power levels, CSIs, or link qualities reported by the UEs to determine a transmit power gradient for transmitting DL data to different groups of UEs using different DL transmit power levels. The base station may associate each of the different DL transmit power levels of the transmit power gradient with a respective group of UEs, and use the transmit power gradient for DL transmissions to UEs belonging to different groups.

The transmit power gradient used by a base station may include DL transmit power levels configured to reduce inter-channel interference (ICI) on one or more UL channels resulting from energy associated with concurrent DL transmissions from the base station. In some instances, the base station (or other suitable network entity) may associate the different DL transmit power levels of the transmit power gradient with the different groups of UEs in a manner that reduces DL emissions that can interfere with the reception of UL data by the base station, without diminishing the ability of UEs in the coverage or service area of the base station to receive the DL transmissions. For example, UEs located closer to the base station may be able to receive and successfully decode DL data at lower DL transmit power levels than UEs located further from the base station, and thus the UEs located closer to the base station may be grouped together in a first group of UEs and associated with a first DL transmit power level, and the UEs located further from the base station may be grouped together in a second group of UEs and associated with a second DL transmit power level, where the first DL transmit power level is less than the second DL transmit power level.

By using reduced DL transmit power levels for DL transmissions to at least some of the UEs within the base station's coverage or service area (such as the UEs belonging to the first group), the base station may reduce inter-channel interference on UL transmissions resulting from concurrent DL transmissions from the base station without diminishing the ability of UEs within the base station's coverage or service area to receive and decode the DL transmissions. In this way, the base station may increase its ability to receive UL data (such as by reducing packet error rates, reducing the number and/or frequency of UL data re-transmissions, and the like) while still providing a certain level of reception coverage for the UEs operating within the base station's cell.

Figure 4A:
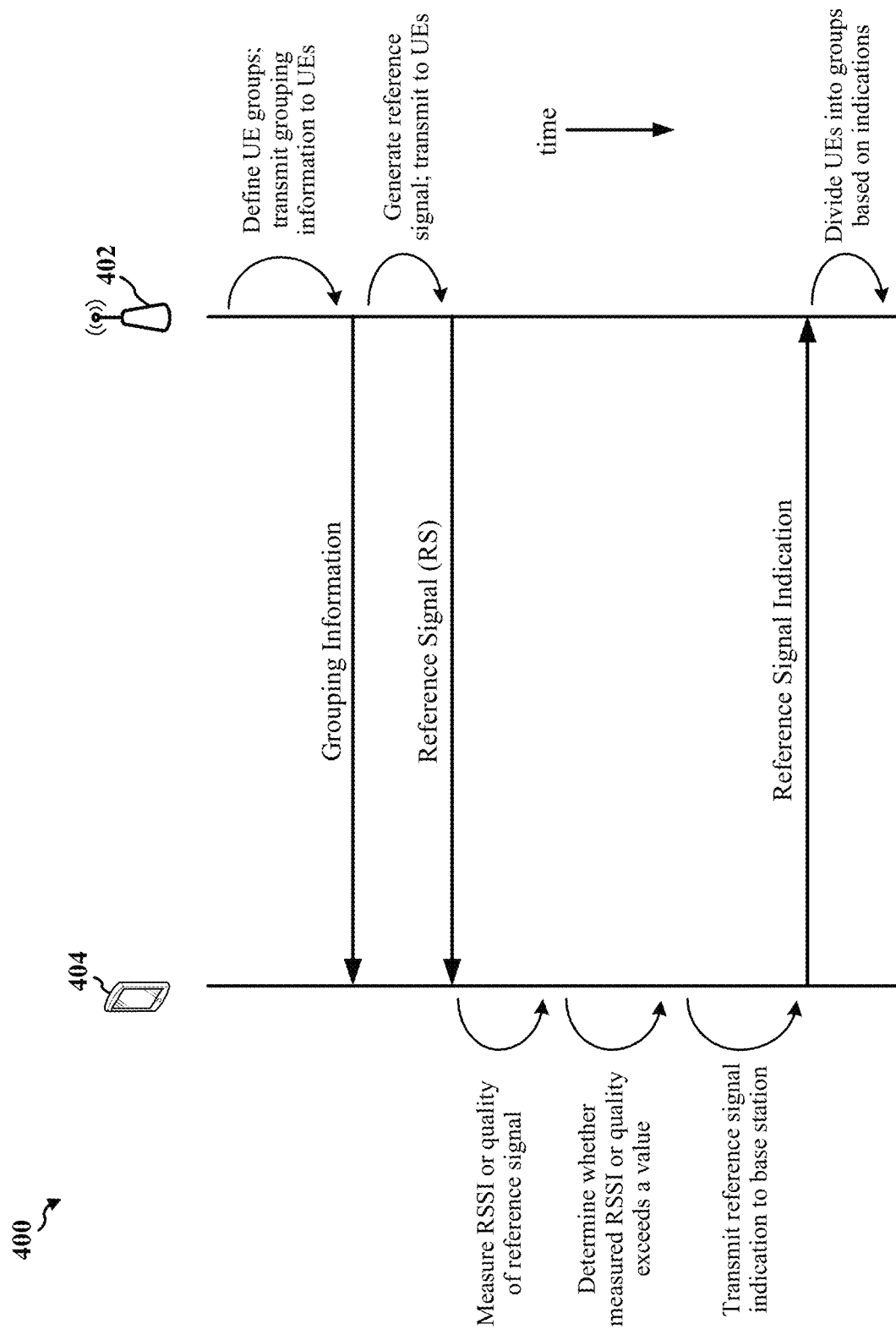
FIG. 4A shows a call flow diagram illustrating an example message exchange between a base station and a UE according to some embodiments.

FIG. 4A shows a call flow diagram illustrating an example message exchange 400 between a base station 402 and a UE 404 in a radio access network (RAN). The base station 402 may be one example of the base station 102 of FIG. 1 or the base station 310 of FIG. 3, and the UE 404 may be one example of the UE 104 of FIG. 1 or the UE 350 of FIG. 3. The base station 402 may be any suitable base station or node including, for example, an nr-gNB, a gNB, or an eNB. The RAN may be any suitable radio access network, and may utilize any suitable radio access technologies. In some implementations, the radio access network may be a 5G NR communication system.

As shown, the base station 402 may define a multitude of UE groups into which the UEs within a coverage or service area of the base station 402 may be divided or grouped. The groups of UEs may be defined based on grouping information indicating one or more parameters common to the UEs within each group. For example, the grouping information may indicate a DL transmit power level for DL transmissions to UEs belonging to each of the defined groups of UEs. In some implementations, the base station 402 may define a first group of UEs for which the base station 402 uses a first DL transmit power level to transmit DL data, and a second group of UEs for which the base station 402 uses a second DL transmit power level to transmit DL data. The first DL transmit power level may be less than the second DL transmit power level, for example, when UEs belonging to the first group are able to receive and successfully decode DL data transmitted at lower power levels than UEs belonging to the second group. In some instances, the base station 402 may use the first DL transmit power level for transmissions of SSBs and/or reference signals to UEs belonging to the first group, and may use the second DL transmit power level for transmissions of SSBs and/or reference signals to UEs belonging to the second group. In other implementations, the base station 402 may define any suitable number of group of UEs, and may select or determine a different DL transmit power level for each group of UEs.

The base station 402 may transmit the grouping information to the UEs within its coverage or service area using any suitable DL signaling. In some implementations, the grouping information may be transmitted to the UEs in a DCI message or a MAC-CE. In some other implementations, the grouping information may be provided to the groups of UEs via RRC configuration.

The base station 402 may also transmit a reference signal to the UE 404. In some implementations, the UE 404 may determine a power level or quality of the received reference signal, and transmit an indication of the measured RSSI or quality of the reference signal to the base station 402. For example, in some instances, the reference signal may be an SSB, and the UE 404 may determine whether the RSSI of the SSB is greater than (or not greater than) a value. In other instances, the reference signal may be a CSI-RS, the UE 404 may determine an energy per resource element (EPRE) of the CSI-RS, and may determine whether the CSI-RS EPRE is greater than (or not greater than) a value. In some other instances, the reference signal may be a DM-RS, the UE 404 may determine an EPRE of the DM-RS, and may determine whether the DM-RS EPRE is greater than (or not greater than) a value.

The base station 402 may use the received indications to determine which of the defined groups of UEs that the UE 404 is to join or belong. The base station 402 may also use the received indications to divide the plurality of UEs within its coverage or service area between the defined groups of UEs. For example, if the UE 404 indicates that the received power or quality of the reference signal is greater than the threshold, the base station 402 may place the UE 404 in groups for which the transmit power level used for DL transmissions is the same as (or lower than) the power level used to transmit the reference signal to the UE 404. Conversely, if the UE 404 indicates that the received power or quality of the reference signal is less than the threshold, the base station 402 may place the UE 404 in groups for which the power level used for DL transmissions is greater than (at least by a certain amount) the power level used to transmit the reference signal to the UE 404.

Figure 4B:
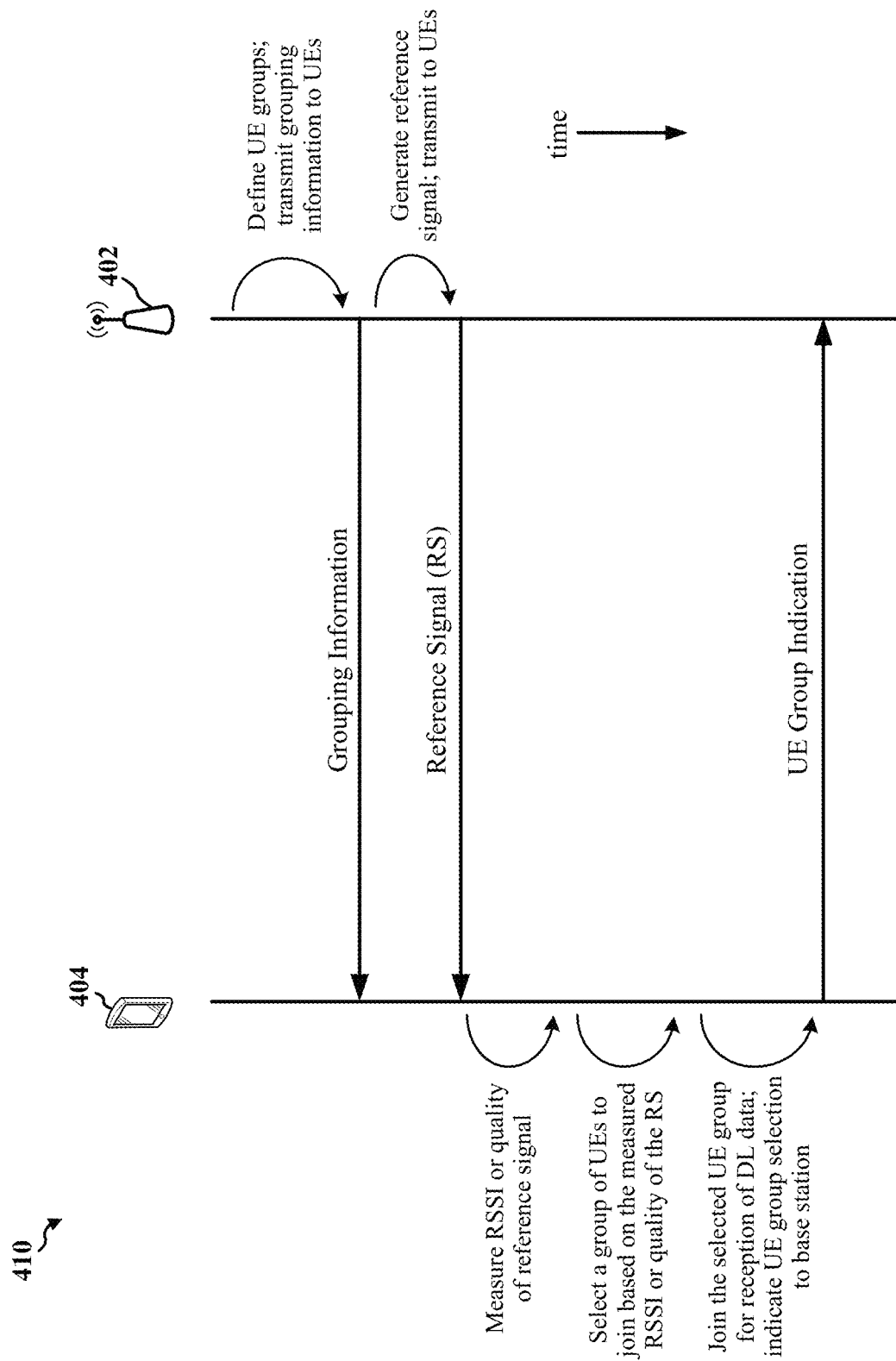
FIG. 4B shows a call flow diagram illustrating another example message exchange between the base station and UE of FIG. 4A according to some embodiments.

FIG. 4B shows a call flow diagram illustrating another example message exchange 410 between the base station 402 and the UE 404. As described with reference to FIG. 4A, the base station 402 may define any suitable number of UE groups into which the UEs within the coverage or service area of the base station 402 may be divided or grouped, and may transmit grouping information to the UEs within its coverage or service area any suitable DL signaling. In some instances, the grouping information may the transmit power level for DL transmissions in each of the defined groups of UEs.

The base station 402 may also transmit a reference signal to the UE 404. The UE 404 may use one or more measurements of the received reference signal to select one of the UE groups to join. In some instances, the reference signal may be an SSB, and the UE 404 may select the UE group to join based on a comparison between an EPRE of the SSB and a threshold. In other instances, the reference signal may be a CSI-RS, and the UE 404 may select the UE group to join based on a comparison between an EPRE of the CSI-RS and a threshold. In some other instances, the reference signal may be a DM-RS, and the UE 404 may select the UE group to join based on a comparison between the transmit power level of the DM-RS and a threshold.

The UE 404 may join or otherwise become associated with the selected group of UEs, transmit an indication of the selected UE group to the base station 402, and thereafter receive DL data transmitted from the base station 404 at the power level selected for that group of UEs. The base station 402 may receive the UE group indication transmitted from the UE 404, and assign the UE 404 to the indicated group of UEs. The base station 402 may also use the UE group indications received from other UEs within its coverage or service area to divide the UEs into the defined groups.

In some implementations, the UE 404 may also determine the power level with which the reference signal is transmitted from the base station 402. In some instances, the reference signal may be an SSB transmitted on the PBCH, and the UE 404 may determine the transmit power level of the reference signal based on the received SSB. For example, the UE 404 may measure the RSSI of the SSB, determine an EPRE of the PBCH, and derive an SSB EPRE based on the determined PBCH EPRE. In other instances, the reference signal may be a CSI-RS, and the UE 404 may determine the transmit power level of the reference signal based on the received CSI-RS. For example, the UE 404 may measure the RSSI of the CSI-RS, determine an EPRE of the PBCH, and determine a CSI-RS EPRE based at least in part on the determined PBCH EPRE and a power offset between the PDSCH resource element (RE) and a CSI-RS RE. In some other instances, the reference signal may be a DM-RS, and the UE 404 may determine the transmit power level of the reference signal based on the received DM-RS. For example, the UE 404 may measure the RSSI of the DM-RS, determine an EPRE of the PBCH, and determine a transmit power level of the DM-RS based at least in part on the determined PBCH EPRE.

Figure 5A:
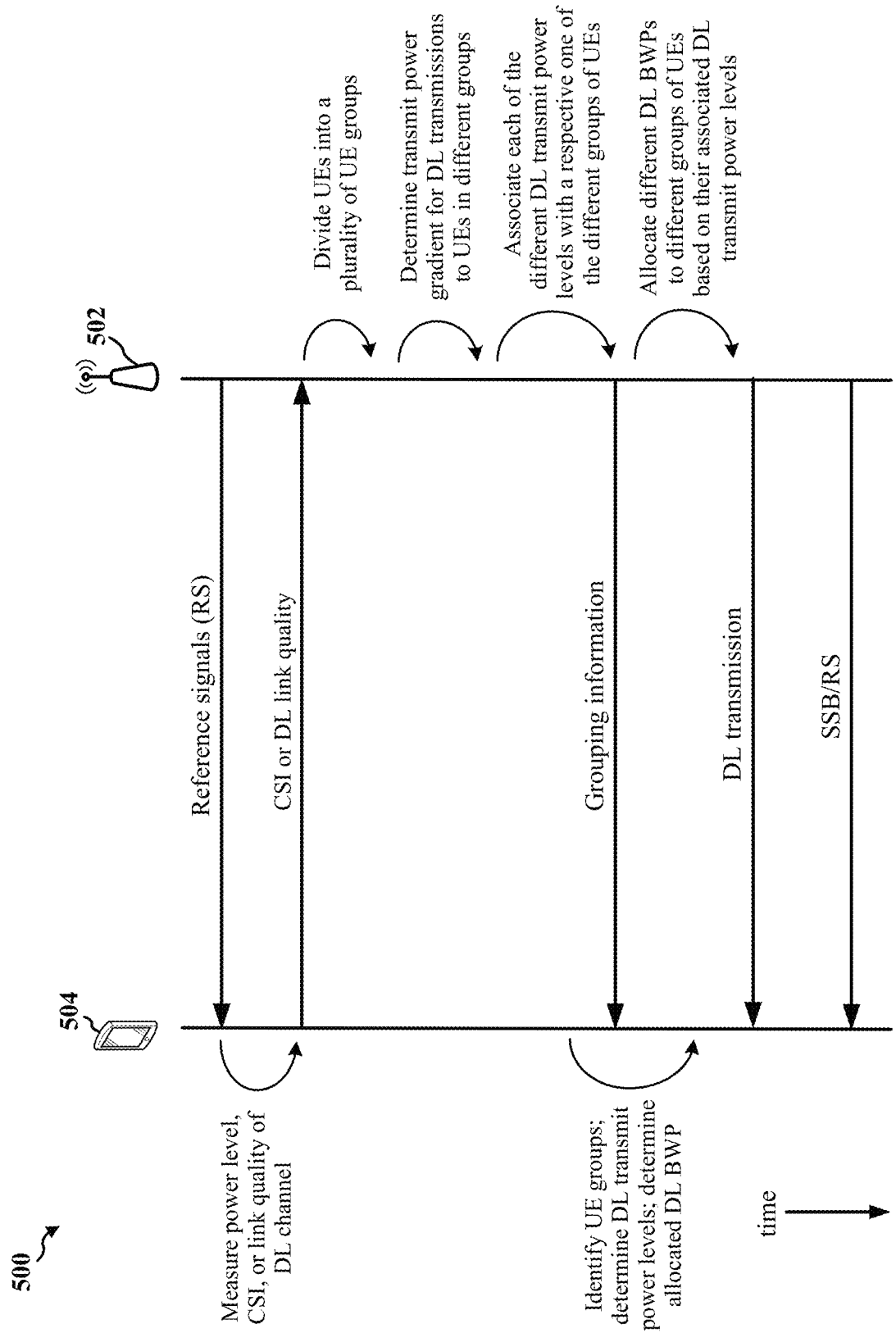
FIG. 5A shows a call flow diagram illustrating an example message exchange between a base station and a UE according to some embodiments.

FIG. 5A shows a call flow diagram illustrating an example message 500 exchange between a base station and a UE according to some other implementations. The base station 502 may be one example of the base station 102 of FIG. 1 or the base station 310 of FIG. 3, and the UE 504 may be one example of the UE 104 of FIG. 1 or the UE 350 of FIG. 3. The base station 502 may be any suitable base station or node including, for example, an nr-gNB a gNB, or an eNB. The RAN may be any suitable radio access network, and may utilize any suitable radio access technologies. In some implementations, the access network may be a 5G NR communication system.

In some instances, the base station 502 may transmit one or more reference signals on a DL channel to the UE 504. The reference signals may include one or more of a channel state information (CSI) reference signal (CSI-RS), a demodulation reference signal (DM-RS), a path loss reference signal (PLRS), a positioning reference signal (PRS), a demodulation reference signal (DM-RS), a phase-tracking reference signal (PT-RS), a beam measurement reference signal (BRS), or a beam refinement reference signal (BRRS).

The UE 504 may use the reference signals to measure one or more of a power level, CSI, or link quality of the DL channel, and may report one or more of the measured power level, CSI, or link quality of the DL channel to the base station 502. In some instances, the base station 502 may use the received power levels, CSIs, or link qualities to determine or estimate the ability of each UE to receive and successfully decode DL data transmitted from the base station 502 at various DL transmit power levels.

The base station 502 may divide the UEs within its coverage or service area into a plurality of groups of UEs, and may determine a transmit power gradient including a plurality of different DL transmit power levels for transmitting DL data to UEs belonging to different groups of UEs. In some instances, the base station 502 may use one or more of the measured power levels, CSIs, or link qualities reported by the UEs to determine the transmit power gradient. The base station 502 may then associate each of the different DL transmit power levels of the transmit power gradient with a respective group of UEs. In some instances, the base station 502 may use the determined or estimated abilities of the UEs to receive and successfully decode DL data transmitted at various transmit power levels to determine which of the different DL transmit power levels to associate with each of the plurality of group of UEs.

In some instances, the base station 502 may configure the transmit power gradient to include DL transmit power levels that, when associated with different groups of UEs, may reduce inter-channel interference (ICI) from the DL transmissions to one or more UL transmissions. For example, when the UE 504 and one or more other UEs (not shown for simplicity) are able to receive and successfully decode DL data at lower DL transmit power levels than another group of UEs, the base station 502 may group the UE 504 and the one or more other UEs into a first group of UEs associated with a first DL transmit power level, and may associate the other group of UEs with a second DL transmit power level that is greater than the first DL transmit power level.

The base station 502 may transmit grouping information to the UE 504. The grouping information may indicate the group of UEs that the UE 504 belongs to, may indicate the DL transmit power level associated with the group of UEs to which the UE 504 belongs, and/or may identify a unique DL BWP allocated to the group of UEs to which the UE 504 belongs. In some instances, the grouping information may be transmitted to the UEs in a DCI message or a MAC-CE. In some other instances, the grouping information may be provided to the UE 504 via RRC configuration.

Then, the base station 502 may transmit DL data to each group of UEs using the DL transmit power level associated with the respective group of UEs. For example, if the UE 504 belongs to a first group of UEs associated with a first DL transmit power level, the base station 502 may transmit DL data to the UE 504 using the first DL transmit power level, and may transmit DL data to other groups of UEs (not shown for simplicity) using different DL transmit power levels based on the transmit power gradient. The UE 504 receives the DL data transmitted from the base station 502.

The base station 502 may allocate a center portion of its frequency bandwidth for the active UL BWP (such as for the PUSCH), and may allocate DL BWPs to one or more groups of UEs based at least in part on their respective DL transmit power levels. In some instances, groups of UEs associated with relatively low DL transmit power levels may be allocated a DL BWP relatively close in frequency to an active UL BWP, while groups of UEs associated with relatively high DL transmit power levels may be allocated a DL BWP relatively far in frequency from the active UL BWP. For example, the UE group associated with the lowest DL transmit power level may be allocated a DL BWP that is adjacent in frequency to the active UL BWP (e.g., and separated by a suitable guard band), and the UE group associated with the highest DL transmit power level may be allocated a DL BWP that is separated in frequency from the active UL BWP by a maximum number of RBs. By allocating DL BWPs closer in frequency to the active UL BWP (such as the frequency band configured for the PUSCH) to groups of UEs associated with relatively low DL transmit power levels, interference on UL transmissions received by the base station resulting from concurrent DL transmissions may be reduced, for example, as compared with allocating DL BWPs adjacent in frequency to the active UL BWP to groups of UEs associated with relatively high DL transmit power levels.

In some other instances, the base station 502 may configure a guard band between the active UL BWP and any DL BWPs that are adjacent in frequency to the active UL BWP based on the DL transmit power levels associated with the one or more groups of UEs. The width of the guard band may be based on the DL transmit power level associated with the group of UEs that is allocated a DL BWP adjacent in frequency to the active UL BWP. For example, if the group of UEs allocated the DL BWP adjacent in frequency to the active UL BWP is associated with a relatively low DL transmit power level, the guard band may be configured to occupy a relatively small frequency bandwidth. Conversely, if the group of UEs allocated the DL BWP adjacent in frequency to the active UL BWP is associated with a relatively high DL transmit power level, the guard band may be configured to occupy a relatively large frequency bandwidth, for example, to mitigate inter-channel interference on UL transmissions resulting from DL transmissions to the group of UEs.

The base station 502 may also transmit a set of SSBs or a set of reference signals to each group of UEs using the DL transmit power level associated with the respective group of UEs.

Figure 5B:
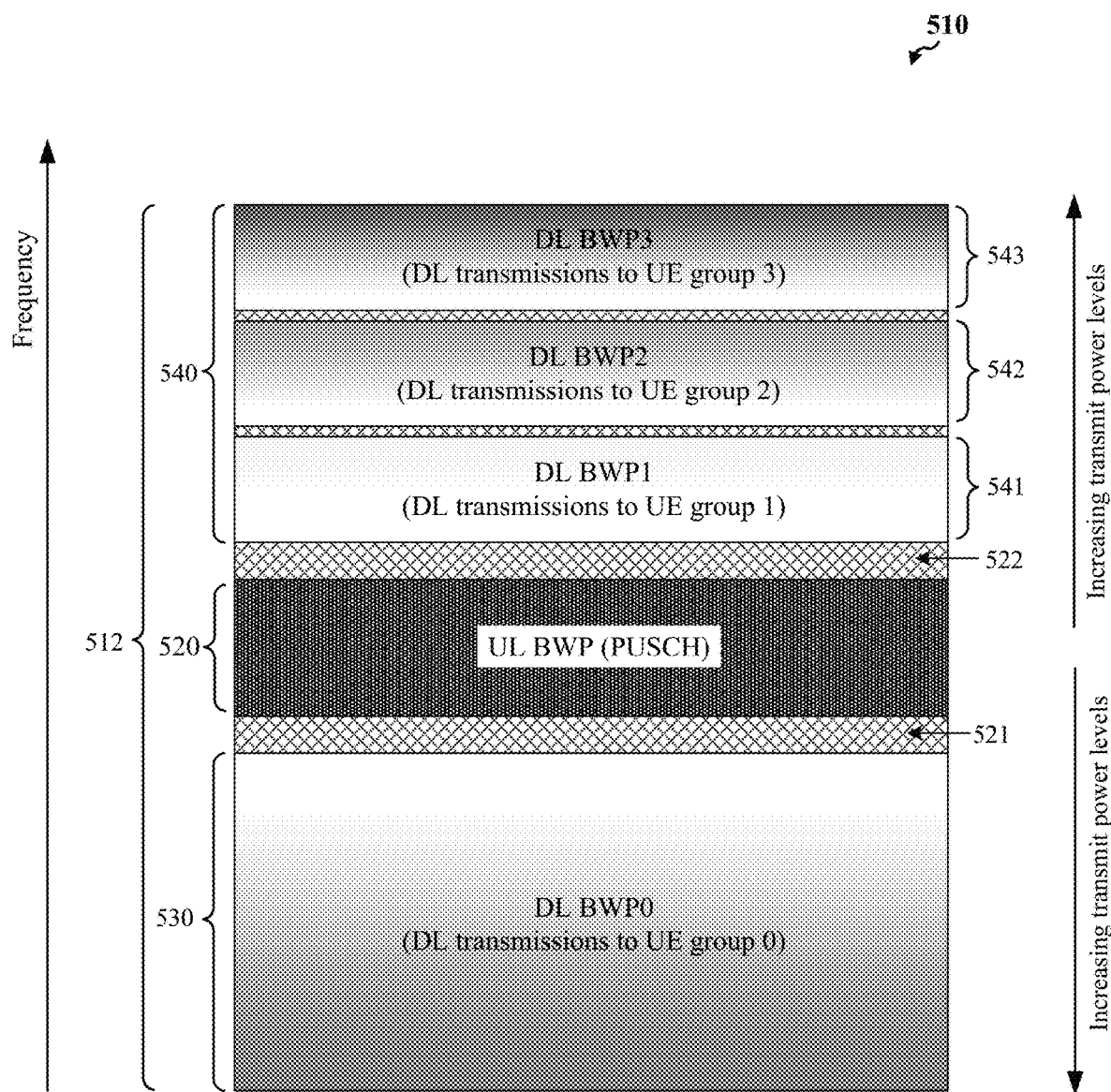
FIG. 5B shows an example allocation of frequency resources in a wireless communication system according to some embodiments.

FIG. 5B shows an example allocation 510 of frequency resources usable in a wireless communication system. In some implementations, the frequency resources shown in FIG. 5B may correspond to a frequency bandwidth 512 of a base station (such as the base station 502 of FIG. 5A), and the allocation 510 of frequency resources within the frequency bandwidth 512 may be based on a DL transmit power gradient determined by the base station for a number of UEs within a coverage or service area of the base station. As shown, an active UL BWP 520 spanning a frequency band in a central portion of the frequency bandwidth 512 is allocated to one or more UL channels (such as the PUSCH), a DL BWP 530 spanning a frequency band in a lower portion of the frequency bandwidth 512 is allocated to a first group of UEs (group 0), and a group of DL BWPs 540 spanning a frequency band in an upper portion of the frequency bandwidth 512 is allocated to three different groups of UEs (groups 1-3). That is, the UL BWP 520 spans a frequency band in the middle of the frequency bandwidth 512, the DL BWP 530 spans a frequency band between a lower edge of the frequency bandwidth 512 and the UL BWP 520, and the group of DL BWPs 540 spans a frequency band between the UL BWP 520 and an upper edge of the frequency bandwidth 512.

Specifically, the DL BWP 530 may include or span a number of resource blocks (RBs) or resource elements (REs) occupying the lowest frequencies of the frequency bandwidth 512, the group of DL BWPs 540 may include or span a number of RBs or REs occupying the highest frequencies of the frequency bandwidth 512, and the UL BWP 520 may include or span a number of RBs or REs occupying the frequencies between the DL BWPs 540 and the DL BWP 530. For the example of FIG. 5B, the group of DL BWPs 540 is divided into 3 DL BWPs 541-543, with the first DL BWP 541 including or spanning a first number of RBs or REs occupying the lowest frequencies of the group of DL BWPs 540, the second DL BWP 542 including or spanning a second number of RBs or REs occupying the middle frequencies of the group of DL BWPs 540, and the third DL BWP 543 including or spanning a third number of RBs or REs occupying the highest frequencies of the DL BWP 540. In some instances, the DL BWPs 541-543 may include or span the same number of RBs or REs, while in some other instances, the DL BWPs 541-543 may include or span different numbers of RBs or REs.

A lower guard band 521 may include or span a number of RBs or REs between the UL BWP 520 and the DL BWP 530, and an upper guard band 522 may include or span a number of RBs or REs between the UL BWP 520 and the group of DL BWPs 540. The lower guard band 521 may be of any suitable width, and may provide isolation between the DL BWP 530 and the UL BWP 520 of the frequency bandwidth 512. The upper guard band 522 may be of any suitable width, and may provide isolation between the group of DL BWPs 540 and the UL BWP 520. In some instances, each of the guard bands 521 and 522 may include or span 5 RBs. In other instances, each of the guard bands 521 and 522 may include or span other numbers of RBs.

The base station may allocate the DL BWPs 541-543 to a number of UE groups based on the DL transmit power levels associated with the UE groups in a manner that minimizes interference of UL channels (such as the PUSCH) resulting from DL transmissions to the UE groups 1-3 using frequency resources of the DL BWPs 541-543, respectively. For example, the first UE group is associated with the lowest DL transmit power level and is allocated the first DL BWP 541 adjacent in frequency to the UL BWP, the second UE group is associated with the next-lowest DL transmit power level and is allocated the second DL BWP 542, and the third UE group is associated with the highest DL transmit power level and is allocated the third DL BWP 543 furthest in frequency from the UL channels. By allocating the DL BWPs 541-543 to the UE groups 1-3 based their respective associated DL transmit power levels, interference on the UL channels resulting from DL transmissions may be reduced (such as compared with allocating the first DL BWP 541 to the UE group associated with the highest DL transmit power).

Figure 5C:
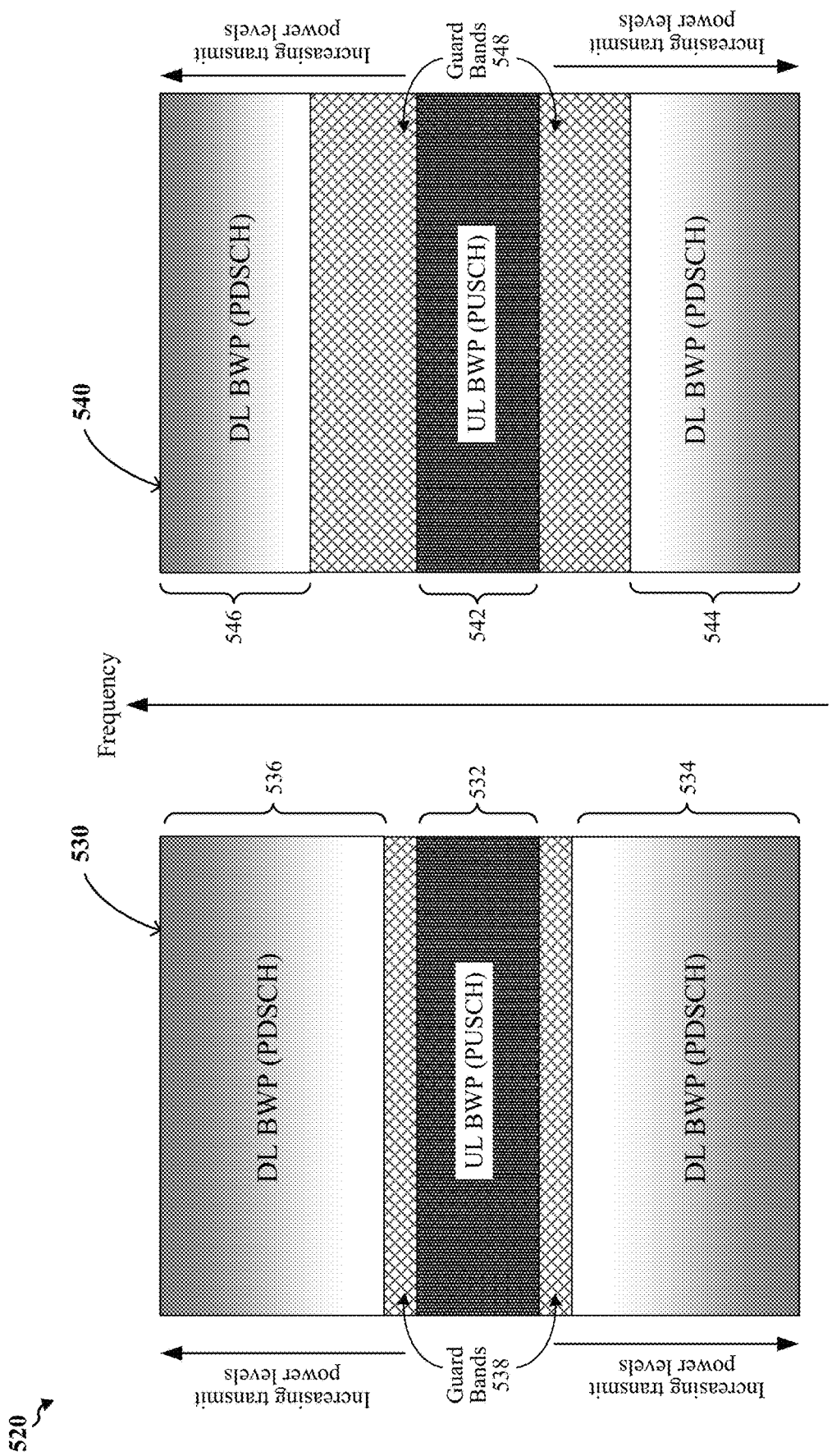
FIG. 5C shows another example allocation of frequency resources in a wireless communication system according to some embodiments.

FIG. 5C shows another example allocation 520 of frequency resources in a wireless communication system. In some implementations, the frequency resources shown in FIG. 5C may correspond to the frequency bandwidth 512 of a base station (such as the base station 502 of FIG. 5A), and the guard bands between the UL BWP and the DL BWPs within the frequency bandwidth 512 may be configured to span different frequency ranges based on the DL transmit power levels associated with UE groups. Specifically, a first BWP allocation 530 includes an active UL BWP 532 allocated to the PUSCH, includes a first DL BWP allocated for DL transmissions to one or more first UE groups on the PDSCH, and includes a second DL BWP 536 allocated for DL transmissions to one or more second UE groups on the PDSCH. A second BWP allocation 540 includes an active UL BWP 542 allocated to the PUSCH, includes a first DL BWP 544 allocated for DL transmissions to the one or more first UE groups on the PDSCH, and includes second DL BWP 546 allocated for DL transmissions to the one or more second UE groups on the PDSCH.

The first BWP allocation 530 includes guard bands 538 between the UL BWP 532 and each of the first DL BWP 534 and the second DL BWP 536, and the second BWP allocation 540 includes guard bands 548 between the UL BWP 542 and each of the first DL BWP 544 and the second DL BWP 546. The guard bands 538 of the first BWP allocation 530 are of a first width, and the guard bands 548 of the second BWP allocation 540 are of a second width that is wider than the first width. As such, the base station may use the first BWP allocation 530 when the DL BWPs are allocated to UE groups associated with relatively low DL transmit power levels, and may use the second BWP allocation 540 when the DL BWPs are allocated to UE groups associated with relatively high DL transmit power levels. By configuring the guard bands to have relatively small widths when DL data is transmitted over portions of the PDSCH adjacent in frequency to the PUSCH using relatively low transmit power levels, as depicted in the first BWP allocation 530, the usable frequency resources of the PDSCH may be increased. Also, by configuring the guard bands to have relatively large widths when DL data is transmitted over portions of the PDSCH adjacent in frequency to the PUSCH using relatively high transmit power levels, as depicted in the second BWP allocation 540, interference on the PUSCH resulting from DL transmissions on the PDSCH may be reduced.

Figure 6:
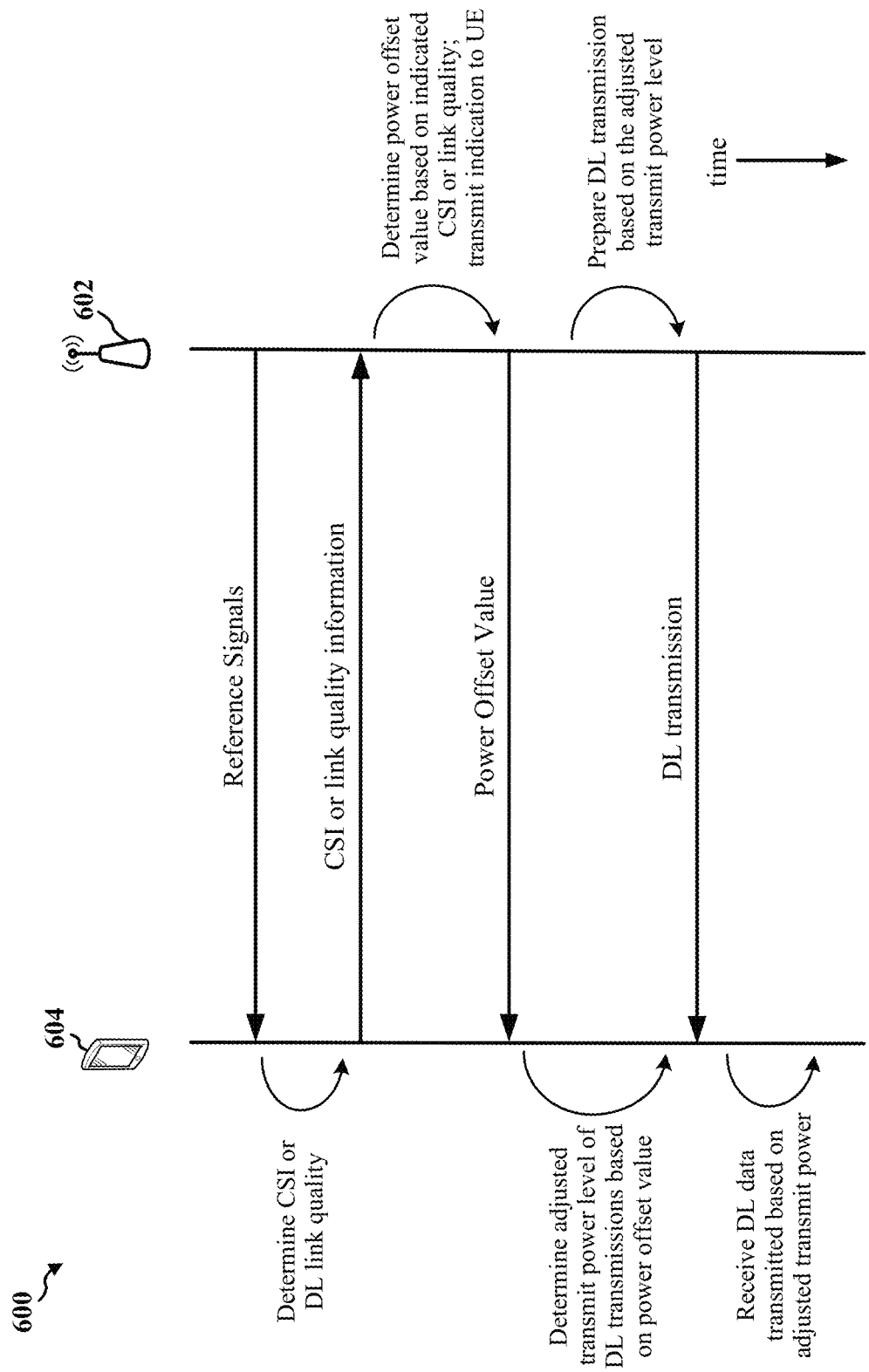
FIG. 6 shows a call flow diagram illustrating an example message exchange between a base station and a UE according to some embodiments.

FIG. 6 shows a call flow diagram illustrating an example message exchange 600 between a base station 602 and a UE 604 according to some other implementations. The base station 602 may be one example of the base station 102 of FIG. 1 or the base station 310 of FIG. 3, and the UE 604 may be one example of the UE 104 of FIG. 1 or the UE 350 of FIG. 3. The base station 602 may be any suitable base station or node including, for example, an nr-gNB, a gNB, or an eNB. The RAN may be any suitable radio access network, and may utilize any suitable radio access technologies. In some implementations, the access network may be a 5G NR communication system.

As shown, the base station 602 may transmit one or more reference signals to the UE 604 on a DL channel. The reference signals may be any reference signal suitable for use in a radio access network, such as a 5G-RAN. In some implementations, the reference signals may be or may include a set of channel state information reference signals (CSI-RS) transmitted using PBCH or PDSCH resources.

The UE 604 receives the reference signals, and determines channel state information (CSI), link quality, or other suitable indicators of the DL channel based at least in part on the received reference signals. The UE 604 transmits indications of the determined CSI or link quality to the base station 602, for example, in an uplink control information (UCI) message.

The base station 602 receives the indications from the UE 604, and may determine a power offset value based on the determined CSI or link quality. The base station 602 may transmit the power offset value to the UE 604. In some instances, the power offset value may be transmitted to the UE 604 in a DCI message or a MAC-CE. In some other instances, the power offset value may be provided to the UE 604 via RRC configuration. In other instances, the UE 602 may include a table that stores one or more different power offset values, and the base station 602 may transmit a look-up indicator, rather than the power offset value, to the UE 604. The UE 604 may store use the received indication to retrieve the power offset value from the table.

The base station 602 may adjust a configured transmit power level based on the determined power offset value to determine an adjusted transmit power level. In some instances, the configured transmit power level may be a power level specified by one or more releases of the Third Generation Partnership Project (3GPP), and the base station 602 may determine the adjusted transmit power level by adding the respective power offset value to the configured transmit power level or by subtracting the respective power offset value from the configured transmit power level. Thereafter, the base station 602 may transmit DL data to the UE 604 using the adjusted transmit power level.

The UE 604 receives the power offset value determined by the base station 602, and may use the power offset value to determine an adjusted transmit power level that was used by the base station 602 for the DL transmission received by the UE 604. The power offset value may indicate a difference between the configured transmit power level of the base station 602 for DL transmissions and the adjusted transmit power level that was used by the base station 602 for the DL transmission. For example, in some implementations, the UE 604 may determine the adjusted transmit power level by adding or subtracting the power offset value to or from the configured transmit power level. In some instances, the received power offset value may be a positive number or a negative number. In some other instances, the base station 602 may set the power offset value to negative infinity to indicate that the base station 602 does not have queued DL data for the UE 604.

In some instances, the power offset value may be a scalar, and the UE 604 may use the scalar to determine the transmit power level of the base station 602 across an entirety of its configured BWP for DL transmissions. In some other instances, the power offset values may be a vector. For example, the vector may include a plurality of offset values, and each offset value may indicate an amount by which the base station 602 has adjusted the configured transmit power level for DL transmissions across a certain frequency band (such as a resource element (RE), a resource block (RB), or a resource block group (RBG)).

Figure 7:
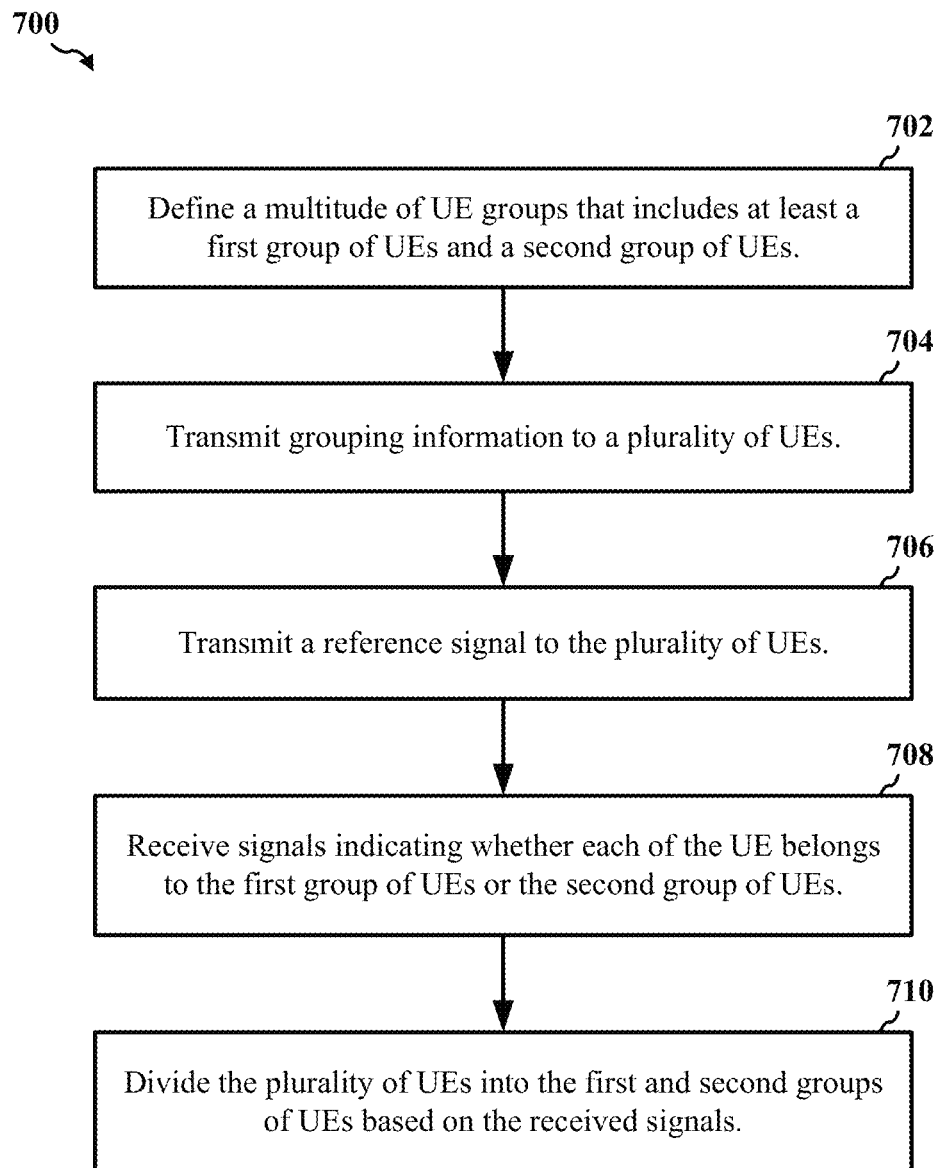
FIG. 7 shows a flowchart depicting an example operation for wireless communication that supports different DL transmit power levels according to some embodiments.

FIG. 7 shows a flowchart depicting an example operation 700 for wireless communication that supports different transmit power levels. The operation 700 may be performed by a wireless communication device such as one or more of the base stations 102 of FIG. 1, the base station 310 of FIG. 3, or the base station 402 of FIGS. 4A-4B. Although described with respect to the base station 402 of FIGS. 4A-4B, the operation 700 may be performed by any suitable base station.

At block 702, the base station defines a multitude of user equipment (UE) groups that includes at least a first group of UEs and a second group of UEs. At block 704, the base station transmits grouping information to each UE of a plurality of UEs. At block 706, the base station transmits a reference signal to each UE of the plurality of UEs. At block 708, the base station receives signals indicating whether each UE of the plurality of UEs belongs to the first group of UEs or the second group of UEs. At block 710, the base station divides the plurality of UEs into the first and second groups of UEs based on the received signals.

In some instances, the UEs belonging to the first group may be closer to the base station than the UEs belonging to the second group, may measure greater RSSI values of the reference signal than UEs belonging to the second group, and/or may experience less path loss than UEs belonging to the second group. In some instances, the grouping information may be transmitted to the UEs in a DCI message or a MAC-CE. In some other instances, the grouping information may be provided to the UEs via RRC configuration.

Figure 8A:
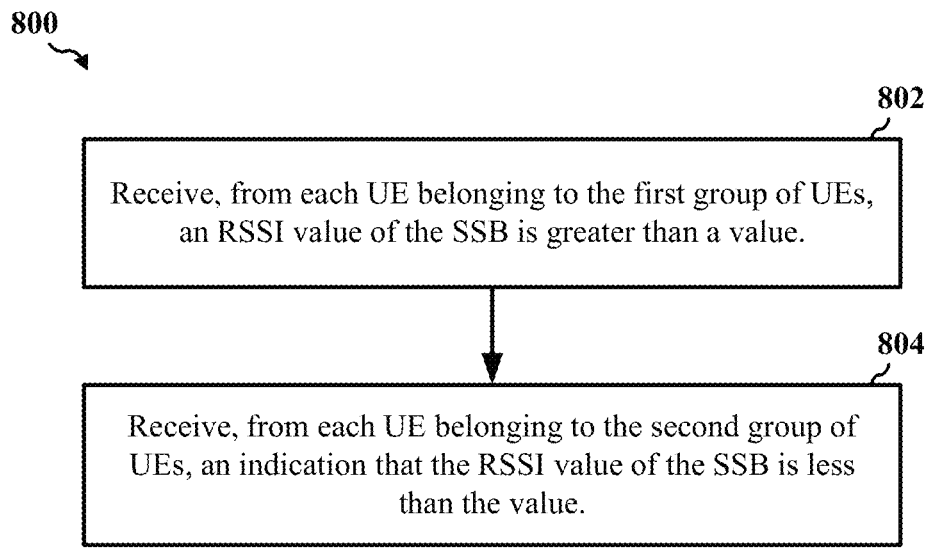
FIGS. 8A-8D show flowcharts depicting example operations for wireless communication that supports different DL transmit power levels according to some embodiments.

FIG. 8A shows a flowchart depicting an example operation 800 for wireless communication that supports different transmit power levels. The operation 800 may be performed by a wireless communication device such as one or more of the base stations 102 of FIG. 1, the base station 310 of FIG. 3, or the base station 402 of FIGS. 4A-4B. Although described with respect to the base station 402 of FIGS. 4A-4B, the operation 800 may be performed by any suitable base station. In some implementations, the operation 800 may be performed after the operation 700 of FIG. 7, and the reference signal may be a SS and physical broadcast channel (PBCH) block (SSB). For example, after dividing the plurality of UEs into the first and second groups of UEs, at block 802, the base station may receive, from each UE belonging to the first group of UEs, an indication that an RSSI of the SSB is greater than a value. At block 804, the base station may receive, from each UE belonging to the second group of UEs, an indication that the RSSI of the SSB is less than the value.

Figure 8B:
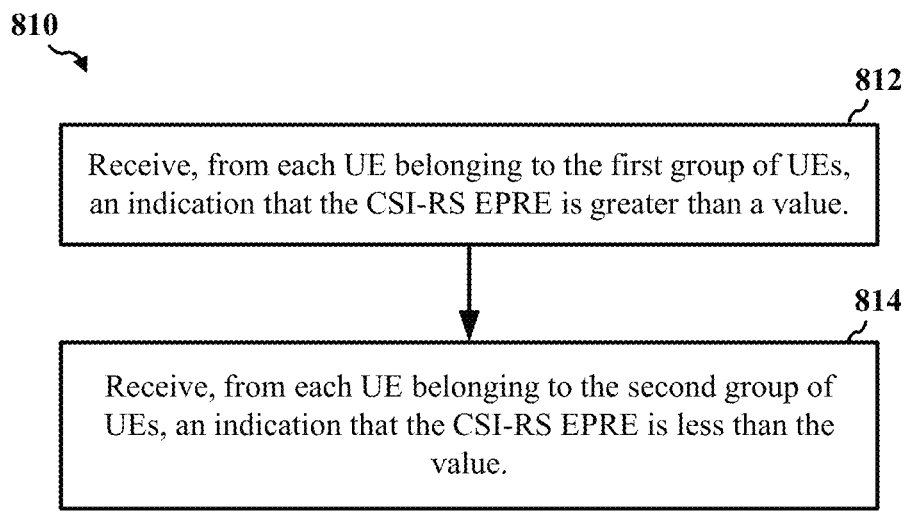

FIG. 8B shows a flowchart depicting an example operation 810 for wireless communication that supports different transmit power levels. The operation 810 may be performed by a wireless communication device such as one or more of the base stations 102 of FIG. 1, the base station 310 of FIG. 3, or the base station 402 of FIGS. 4A-4B. Although described with respect to the base station 402 of FIGS. 4A-4B, the operation 810 may be performed by any suitable base station. In some implementations, the operation 810 may be performed after the operation 700 of FIG. 7, and the reference signal may be a CSI-RS. For example, after dividing the plurality of UEs into the first and second groups of UEs, at block 812, the base station may receive, from each UE belonging to the first group of UEs, an indication that the CSI-RS EPRE is greater than a value. At block 814, the base station may receive, from each UE belonging to the second group of UEs, an indication that the CSI-RS EPRE is less than the value.

In some implementations, the CSI-RS EPRE is based on higher-layer parameters ss-PBCH-BlockPower and powerControlOffset.

Figure 8C:
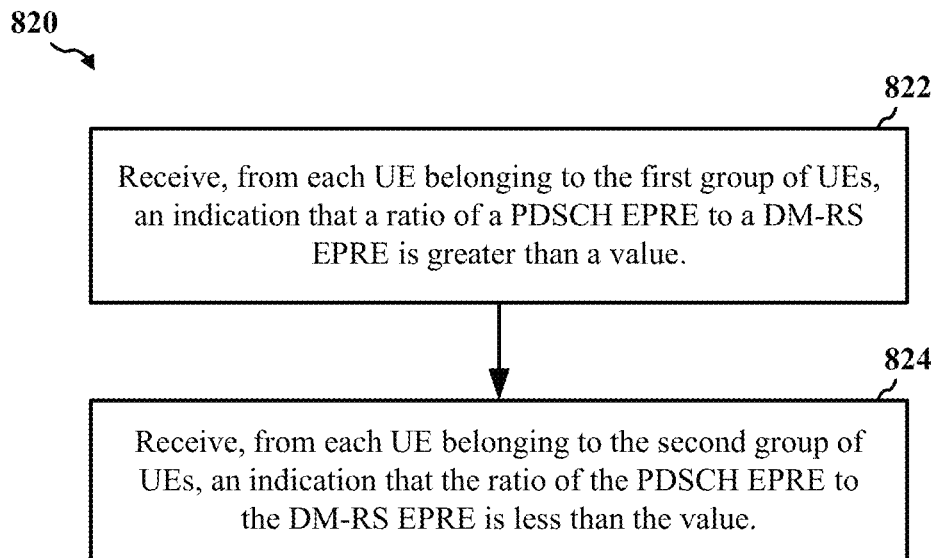

FIG. 8C shows a flowchart depicting an example operation 820 for wireless communication that supports different transmit power levels. The operation 820 may be performed by a wireless communication device such as one or more of the base stations 102 of FIG. 1, the base station 310 of FIG. 3, or the base station 402 of FIGS. 4A-4B. Although described with respect to the base station 402 of FIGS. 4A-4B, the operation 820 may be performed by any suitable base station. In some implementations, the operation 820 may be performed after the operation 700 of FIG. 7, and the reference signal may be a DM-RS. For example, after dividing the plurality of UEs into the first and second groups of UEs, at block 822, the base station may receive, from each UE belonging to the first group of UEs, an indication that a ratio of a PDSCH EPRE to a DM-RS EPRE is greater than a value. At block 824, the base station may receive, from each UE belonging to the second group of UEs, an indication that the ratio of the PDSCH EPRE to the DM-RS EPRE is less than the value. In some implementations, the PBCH EPRE is indicated by the higher-layer parameter ss-PBCH-BlockPower.

Figure 8D:
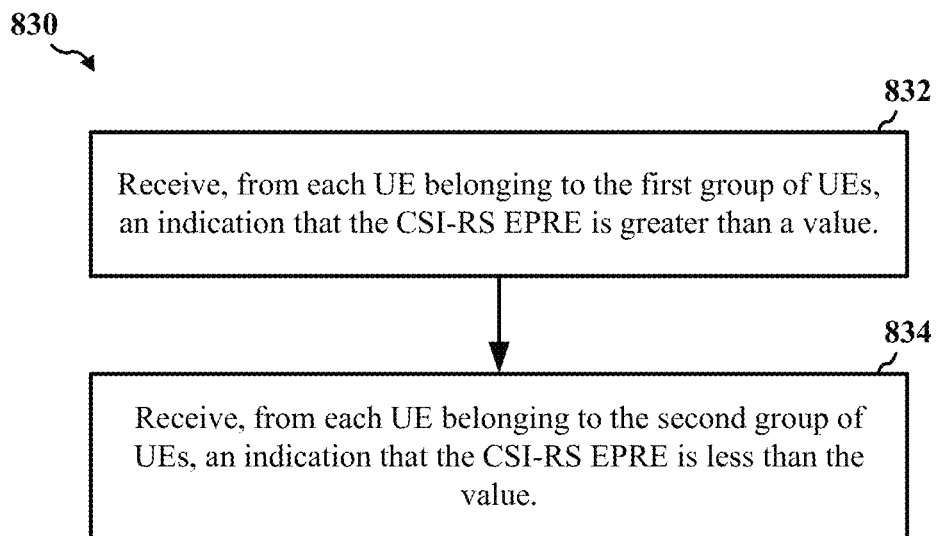

FIG. 8D shows a flowchart depicting an example operation 830 for wireless communication that supports different transmit power levels. The operation 830 may be performed by a wireless communication device such as one or more of the base stations 102 of FIG. 1, the base station 310 of FIG. 3, or the base station 402 of FIGS. 4A-4B. Although described with respect to the base station 402 of FIGS. 4A-4B, the operation 830 may be performed by any suitable base station. In some implementations, the operation 830 may be performed after the operation 700 of FIG. 7, and the reference signal may be a PLRS. For example, after dividing the plurality of UEs into the first and second groups of UEs, at block 832, the base station may receive, from each UE belonging to the first group of UEs, an indication that a ratio of a PDSCH EPRE to a DM-RS EPRE is greater than a value. At block 834, the base station may receive, from each UE belonging to the second group of UEs, an indication that the ratio of the PDSCH EPRE to the DM-RS EPRE is less than the value.

Figure 9:
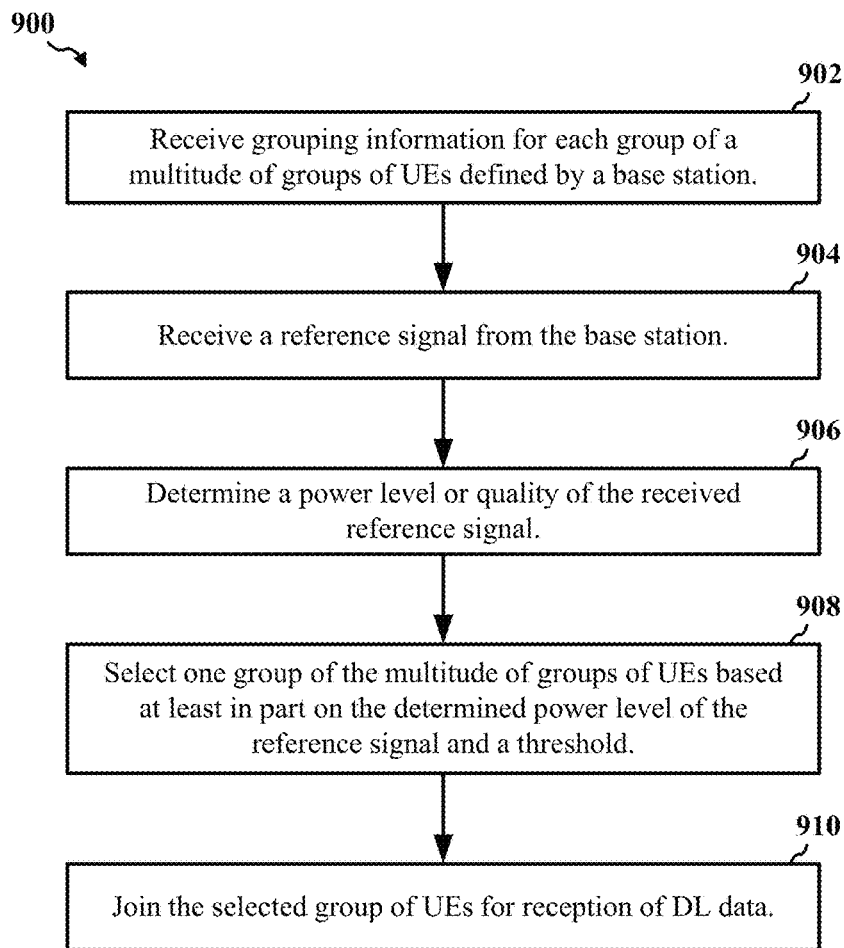
FIG. 9 shows a flowchart depicting an example operation for wireless communication that supports different DL transmit power levels according to some embodiments.

FIG. 9 shows a flowchart depicting an example operation 900 for wireless communication that supports different transmit power levels. The operation 900 may be performed by a wireless communication device such as the UE 104 of FIG. 1, the UE 350 of FIG. 3, or the UE 404 of FIGS. 4A-4B. Although described with respect to the UE 404 of FIGS. 4A-4B, the operation 900 may be performed by any suitable UE.

At block 902, the UE receives grouping information for each group of a multitude of groups of UEs defined by a base station. At block 904, the UE receives a reference signal from the base station. At block 906, the UE determines a power level or quality of the received reference signal. At block 908, the UE selects one of the groups of UEs based at least in part on the determined power level of the reference signal. At block 910, the UE joins the selected group of UEs for reception of DL data.

In some implementations, the grouping information may identify a unique DL BWP allocated to each group of the plurality of groups of UEs for DL transmissions. In some instances, the grouping information may indicate a first transmit power level for DL transmissions to UEs belonging to a first group of UEs, and may indicate a second transmit power level, different than the first transmit power level, for DL transmissions to UEs belonging to a second group of UEs.

In some implementations, the reference signal may be a path loss reference signal (PLRS), and the determination of the power level may be based at least in part on a received signal strength indicator (RSSI) value of the PLRS. In some instances, determining the quality of the received reference signal may be based on estimated channel conditions for one or more of an UL channel or a DL channel.

Figure 10A:
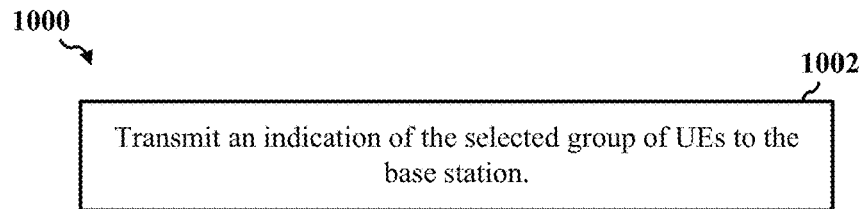
FIGS. 10A-10B show flowcharts depicting example operations for wireless communication that supports different DL transmit power levels according to some embodiments.

FIG. 10A shows a flowchart depicting an example operation 1000 for wireless communication that supports different transmit power levels. The operation 1000 may be performed by a UE such as the UE 104 of FIG. 1, the UE 350 of FIG. 3, or the UE 404 of FIGS. 4A-4B. Although described with respect to the UE 404 of FIGS. 4A-4B, the operation 1000 may be performed by any suitable UE. In some implementations, the operation 1000 may be performed after the operation 900 of FIG. 9. For example, after joining the selected group of UEs for reception of DL data, at block 1002, the UE may transmit an indication of the selected group of UEs to the base station. In some instances, the grouping information may be received by the UE in a DCI message or a MAC-CE. In some other instances, the grouping information may be received by the UE via RRC configuration.

Figure 10B:
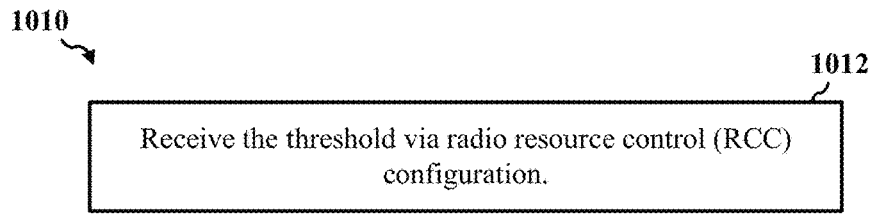

FIG. 10B shows a flowchart depicting an example operation 1010 for wireless communication that supports different transmit power levels. The operation 1010 may be performed by a UE such as the UE 104 of FIG. 1, the UE 350 of FIG. 3, or the UE 404 of FIGS. 4A-4B. Although described with respect to the UE 404 of FIGS. 4A-4B, the operation 1010 may be performed by any suitable UE. In some implementations, the operation 1010 may be performed after the operation 900 of FIG. 9. For example, after joining the selected group of UEs for reception of DL data, at block 1012, the UE may receive the threshold via RRC configuration. The grouping information may be received by the UE in one or more of a DCI message, a MAC-CE, or a RRC configuration.

Figure 11A:
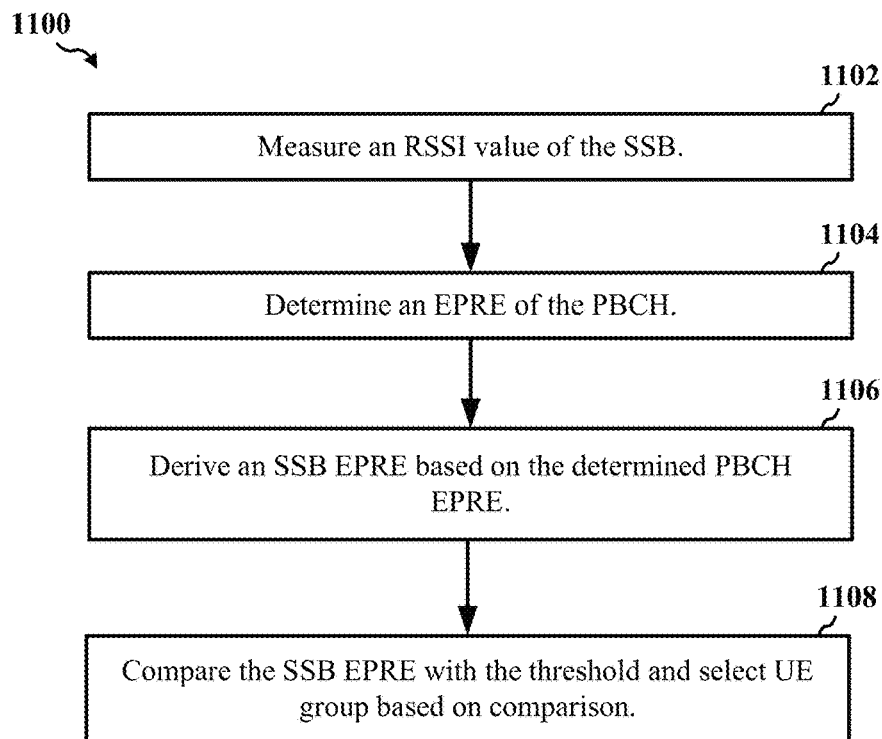
FIGS. 11A-11D show flowcharts depicting example operations for wireless communication that supports different DL transmit power levels according to some embodiments.

FIG. 11A shows a flowchart depicting an example operation 1100 for wireless communication that supports different transmit power levels. The operation 1100 may be performed by a UE such as the UE 104 of FIG. 1, the UE 350 of FIG. 3, or the UE 404 of FIGS. 4A-4B. Although described with respect to the UE 404 of FIGS. 4A-4B, the operation 1100 may be performed by any suitable UE. In some aspects, the operation 1100 may be one implementation for determining the power level in block 906 of the operation 900 of FIG. 9, and the reference signal may be a synchronization signal (SS) and physical broadcast channel (PBCH) block (SSB). For example, after receiving the DL reference signal from the base station, at block 1102, the UE may measure an RSSI of the SSB. At block 1104, the UE may determine an energy per resource element (EPRE) of the PBCH. At block 1106, the UE may derive an SSB EPRE based on the determined PBCH EPRE. The PBCH EPRE may be indicated by the higher-layer parameter ss-PBCH-BlockPower. In some implementations, the operation 1100 may continue at block 1108 with the UE comparing the SSB EPRE with the threshold, and selecting the one group of UEs based on the comparison.

Figure 11B:
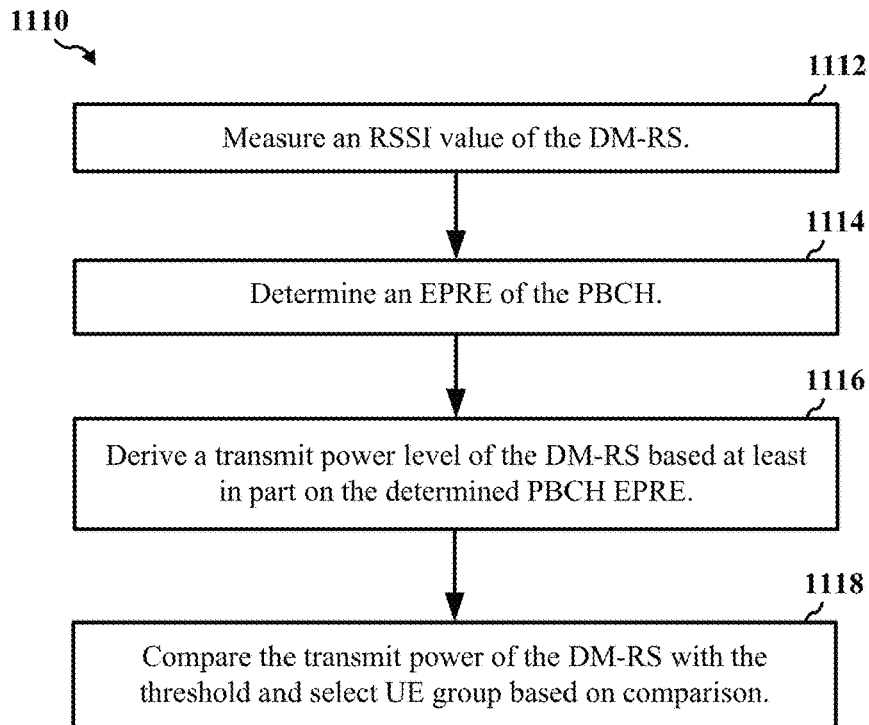

FIG. 11B shows a flowchart depicting an example operation 1110 for wireless communication that supports different transmit power levels. The operation 1110 may be performed by a UE such as the UE 104 of FIG. 1, the UE 350 of FIG. 3, or the UE 404 of FIGS. 4A-4B. Although described with respect to the UE 404 of FIGS. 4A-4B, the operation 1110 may be performed by any suitable UE. In some aspects, the operation 1110 may be one implementation for determining the power level in block 906 of the operation 900 of FIG. 9, and the reference signal may be a DM-RS. For example, after receiving the DL reference signal from the base station, at block 1112, the UE may measure an RSSI of the DM-RS. At block 1114, the UE may determine an EPRE of the PBCH. At block 1116, the UE may derive a transmit power level of the DM-RS based at least in part on the determined PBCH EPRE. The may be indicated by the higher-layer parameter ss-PBCH-BlockPower. In some implementations, the operation 1110 may continue at block 1118 with the UE comparing the transmit power of the DM-RS with the threshold, and selecting the one group of UEs based on the comparison.

Figure 11C:
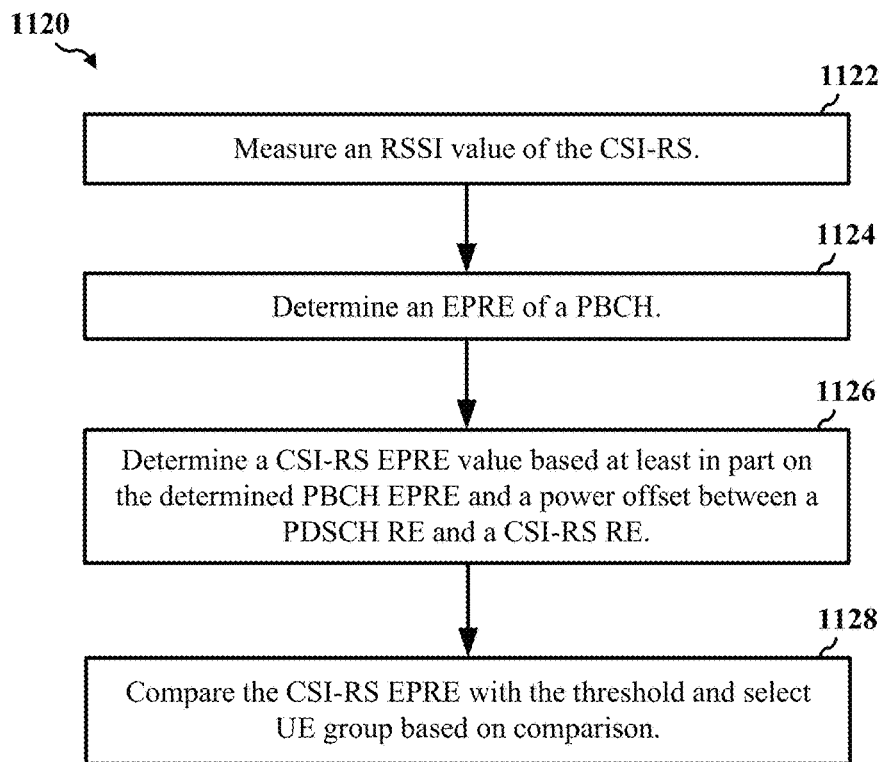

FIG. 11C shows a flowchart depicting an example operation 1120 for wireless communication that supports different transmit power levels. The operation 1120 may be performed by a UE such as the UE 104 of FIG. 1, the UE 350 of FIG. 3, or the UE 404 of FIGS. 4A-4B. Although described with respect to the UE 404 of FIGS. 4A-4B, the operation 1120 may be performed by any suitable UE. In some aspects, the operation 1120 may be one implementation for determining the power level of the received reference signal in block 906 of FIG. 9, and the reference signal may be a channel state information (CSI) reference signal (CSI-RS). For example, after receiving the reference signal from the base station, at block 1122, the UE may measure an RSSI of the CSI-RS. At block 1124, the UE may determine an EPRE of the PBCH. At block 1126, the UE may determine a CSI-RS EPRE based at least in part on the determined PBCH EPRE and a power offset between a physical downlink shared channel (PDSCH) resource element (RE) and a CSI-RS RE. The PBCH EPRE may be indicated by the higher-layer parameter ss-PBCH-BlockPower, and the power offset may be indicated by the higher-layer parameter pow erControlOffset. In some implementations, the operation 1120 may continue at block 1128 with the UE comparing the determined CSI-RS EPRE with the threshold, and selecting the one group of UEs based on the comparison.

Figure 11D:
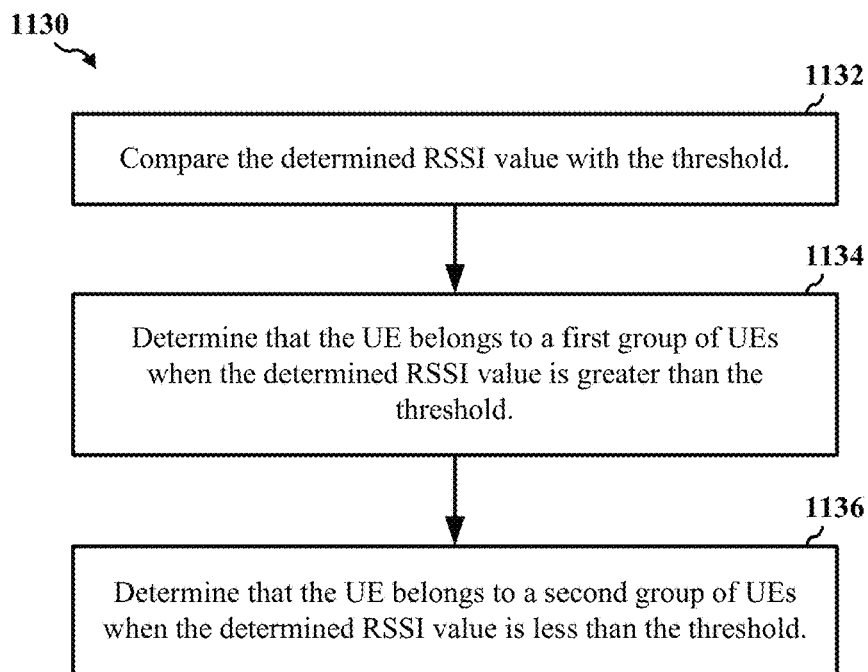

FIG. 11D shows a flowchart depicting an example operation 1130 for wireless communication that supports different transmit power levels. The operation 1130 may be performed by a UE such as the UE 104 of FIG. 1, the UE 350 of FIG. 3, or the UE 404 of FIGS. 4A-4B. Although described with respect to the UE 404 of FIGS. 4A-4B, the operation 1130 may be performed by any suitable UE. In some aspects, the operation 1130 may be one implementation for determining the power level of the received reference signal in block 906 of FIG. 9. For example, after receiving the reference signal from the base station, at block 1132, the UE may compare the determined RSSI with the threshold. At block 1134, the UE may determine that the UE belongs to a first group of UEs when the determined RSSI is greater than the threshold, and at block 1136 may determine that the UE belongs to a second group of UEs when the determined RSSI is less than the threshold. In some instances, the UEs belonging to the first group may be closer to the base station than the UEs belonging to the second group.

Figure 12:
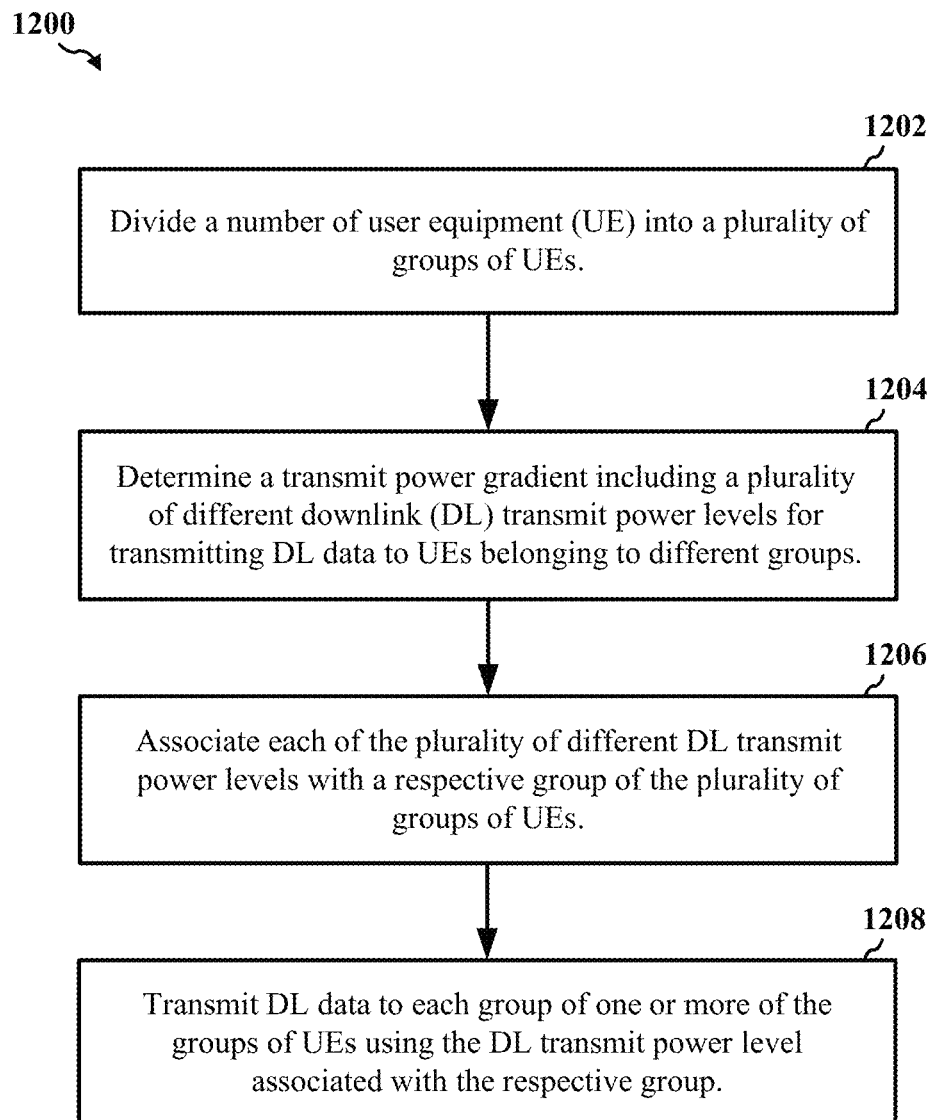
FIG. 12 shows a flowchart depicting an example operation for wireless communication that supports different DL transmit power levels according to some embodiments.

FIG. 12 shows a flowchart depicting an example operation 1200 for wireless communication that supports different DL transmit power levels. The operation 1200 may be performed by a wireless communication device such as one or more of the base stations 102 of FIG. 1, the base station 310 of FIG. 3, or the base station 502 of FIG. 5A. Although described with respect to the base station 502 of FIG. 5A, the operation 1200 may be performed by any suitable base station.

At block 1202, the base station divides a number of UEs into a plurality of groups of UEs. At block 1204, the base station determines a transmit power gradient including a plurality of different DL transmit power levels for transmitting downlink (DL) data to UEs belonging to different groups of UEs. At block 1206, the base station associates each of the plurality of different DL transmit power levels with a respective group of the plurality of groups of UEs. At block 1208, the base station transmits DL data to each group of one or more of the groups of UEs using the DL transmit power level associated with the respective group.

Figure 13A:
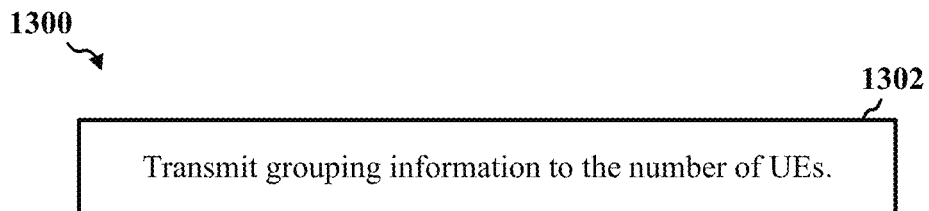
FIGS. 13A-13B show flowcharts depicting example operations for wireless communication that supports different DL transmit power levels according to some embodiments.

FIG. 13A shows a flowchart depicting an example operation 1300 for wireless communication that supports different DL transmit power levels. The operation 1300 may be performed by a wireless communication device such as one or more of the base stations 102 of FIG. 1, the base station 310 of FIG. 3, or the base station 502 of FIG. 5A. Although described with respect to the base station 502 of FIG. 5A, the operation 1300 may be performed by any suitable base station. In some instances, the operation 1300 may be performed prior to transmitting the DL data in block 1208 of FIG. 12. In some other instances, the operation 1300 may be performed after the operation 1200 of FIG. 12.

At block 1302, the base station 502 may transmit grouping information to the number of UEs. The grouping information may indicate one or more of the group of UEs that each UE of the number of UEs belongs to, the DL transmit power level associated with each group of the one or more groups of UEs, or a unique DL BWP allocated to each group of the one or more groups of UEs. In some instances, the grouping information may be transmitted to the UEs in a DCI message or a MAC-CE. In some other instances, the grouping information may be provided to the UEs via RRC configuration.

Figure 13B:
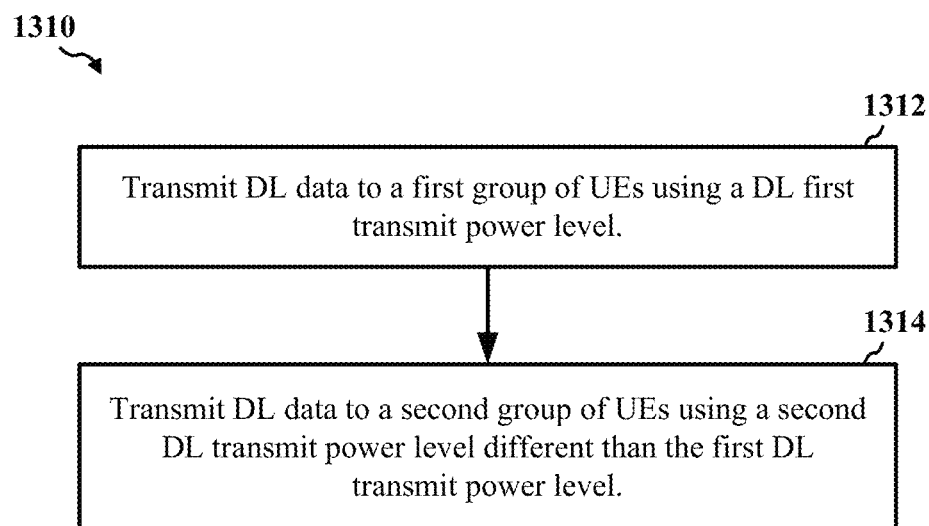

FIG. 13B shows a flowchart depicting an example operation 1310 for wireless communication that supports different DL transmit power levels. The operation 1310 may be performed by a wireless communication device such as one or more of the base stations 102 of FIG. 1, the base station 310 of FIG. 3, or the base station 502 of FIG. 5A. Although described with respect to the base station 502 of FIG. 5A, the operation 1310 may be performed by any suitable base station. In some implementations, the operation 1310 may be one example of transmitting DL to the UEs in block 1208 of FIG. 12. For example, at block 1312, the base station 502 may transmit DL data to a first group of UEs using a DL first transmit power level, and at block 1314, the base station may transmit DL data to a second group of UEs using a second DL transmit power level different than the first DL transmit power level.

The first DL transmit power level may be less than the second DL transmit power level, and at least some of the UEs belonging to the first group of UEs may be closer to the base station or may have smaller time advance (TA) values than UEs belonging to the second group of UEs. In some instances, the first DL transmit power level may be a transmit power level configured for DL transmissions from the base station by one or more releases of the 3GPP, and the second DL transmit power level may be an increased transmit power level relative to the configured transmit power level. In other instances, the second DL transmit power level may be a transmit power level configured for DL transmissions from the base station by one or more releases of the 3GPP, and the first DL transmit power level may be a reduced transmit power level relative to the configured transmit power level. In some implementations, a difference between the first and second DL transmit power levels may be a configured power offset value. In some instances, the configured power offset value may be indicated to the UEs in a DCI message or a MAC-CE. In other instances, the configured power offset value may be indicated to the UEs via RRC configuration.

Figure 14:
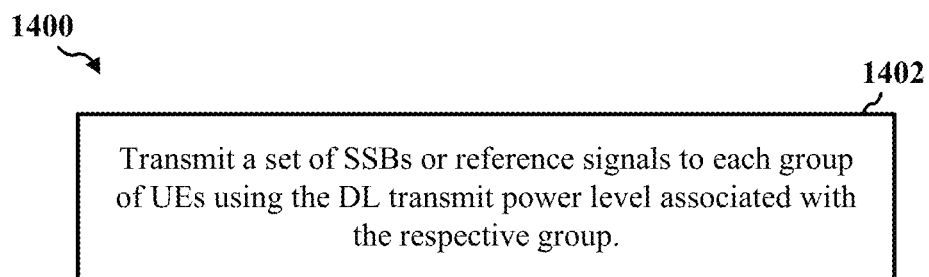
FIG. 14 shows a flowchart depicting an example operation for wireless communication that supports different DL transmit power levels according to some embodiments.

FIG. 14 shows a flowchart depicting an example operation 1400 for wireless communication that supports different DL transmit power levels. The operation 1400 may be performed by a wireless communication device such as one or more of the base stations 102 of FIG. 1, the base station 310 of FIG. 3, or the base station 502 of FIG. 5A. Although described with respect to the base station 502 of FIG. 5A, the operation 1400 may be performed by any suitable base station. In some instances, the operation 1400 may be performed after the operation 1200 of FIG. 12. For example, after transmitting DL data to the groups of UEs using their respective associated DL transmit power levels, the base station 502 may, at block 1402, transmit a set of synchronization signal (SS) and physical broadcast channel (PBCH) blocks (SSBs) or a set of reference signals to each group of the one or more groups of UEs using the DL transmit power level associated with the respective group.

Figure 15A:
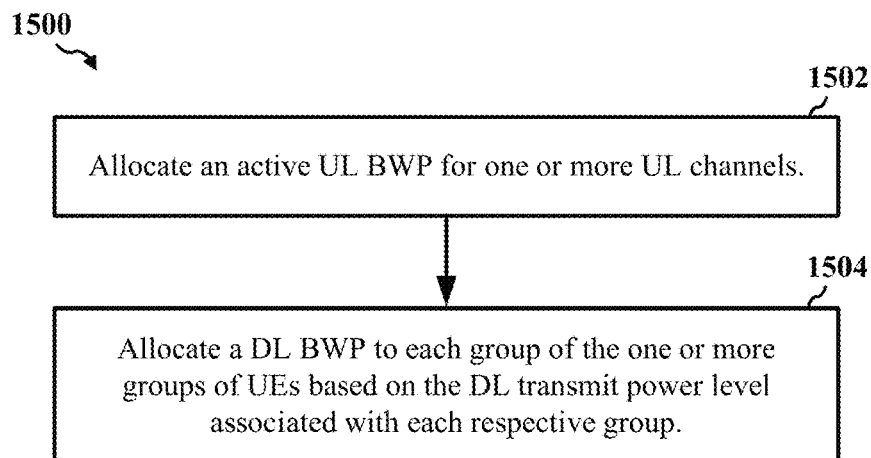
FIGS. 15A-15B show flowcharts depicting example operations for wireless communication that supports different DL transmit power levels according to some embodiments.

FIG. 15A shows a flowchart depicting an example operation 1500 for wireless communication that supports different DL transmit power levels. The operation 1500 may be performed by a wireless communication device such as one or more of the base stations 102 of FIG. 1, the base station 310 of FIG. 3, or the base station 502 of FIG. 5A. Although described with respect to the base station 502 of FIG. 5A, the operation 1500 may be performed by any suitable base station. In some instances, the operation 1500 may be performed after the operation 1200 of FIG. 12. For example, after transmitting DL data to the groups of UEs using their respective associated DL transmit power levels, the base station 502 may, at block 1502, allocate an active UL BWP for one or more UL channels (such as a physical uplink shared channel (PUSCH)). At block 1504, the base station may allocate a DL BWP to each group of one or more of the groups of UEs based on the DL transmit power level associated with the respective group.

In some instances, groups of UEs associated with relatively low DL transmit power levels may be allocated DL BWPs closer in frequency to the active UL BWP than groups of UEs associated with relatively high DL transmit power levels. In some other instances, the DL BWPs adjacent to the active UL BWP may be allocated to groups of UEs associated with the lowest DL transmit power levels, and the DL BWPs furthest from the active UL BWP may be allocated to groups of UEs associated with the highest DL transmit power levels. By allocating DL BWPs closer in frequency to the active UL BWP to groups of UEs associated with relatively low DL transmit power levels, interference on the UL channels (such as the PUSCH) resulting from DL transmissions may be reduced, for example, as compared with DL transmissions using frequency resources adjacent to the active UL BWP.

Figure 15B:
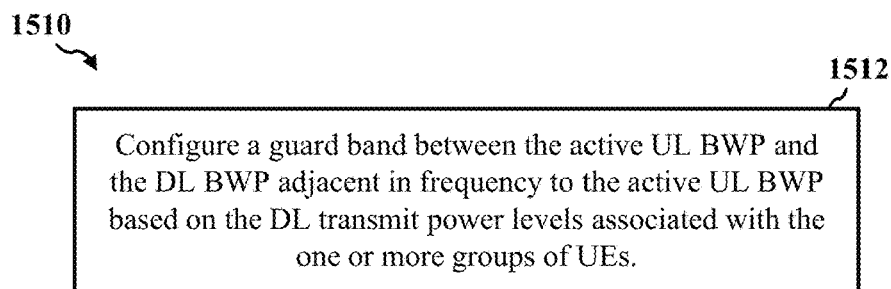

FIG. 15B shows a flowchart depicting an example operation 1510 for wireless communication that supports different DL transmit power levels. The operation 1510 may be performed by a wireless communication device such as one or more of the base stations 102 of FIG. 1, the base station 310 of FIG. 3, or the base station 502 of FIG. 5A. Although described with respect to the base station 502 of FIG. 5A, the operation 1510 may be performed by any suitable base station. In some instances, the operation 1510 may be performed after the operation 1500 of FIG. 15A. For example, after allocating the active UL BWP for the one or more UL channels and allocating the DL BWPs to the different group of UEs, the base station 502 may, at block 1512, configure a guard band between the active UL BWP and the DL BWPs adjacent in frequency to the active UL BWP based on the DL transmit power levels associated with the one or more groups of UEs.

In some instances, a width of the guard band may be based on the DL transmit power level associated with the group of UEs that is allocated the DL BWP adjacent in frequency to the active UL BWP. For example, if the group of UEs allocated the DL BWP adjacent in frequency to the active UL BWP is associated with a relatively low DL transmit power level, the guard band may occupy a relatively small frequency bandwidth. Conversely, if the group of UEs allocated the DL BWP adjacent in frequency to the active UL BWP is associated with a relatively high DL transmit power level, the guard band may occupy a relatively large frequency bandwidth, for example, to mitigate inter-channel interference on the UL channels (such as the PUSCH) resulting from DL transmissions to the group of UEs.

Figure 16:
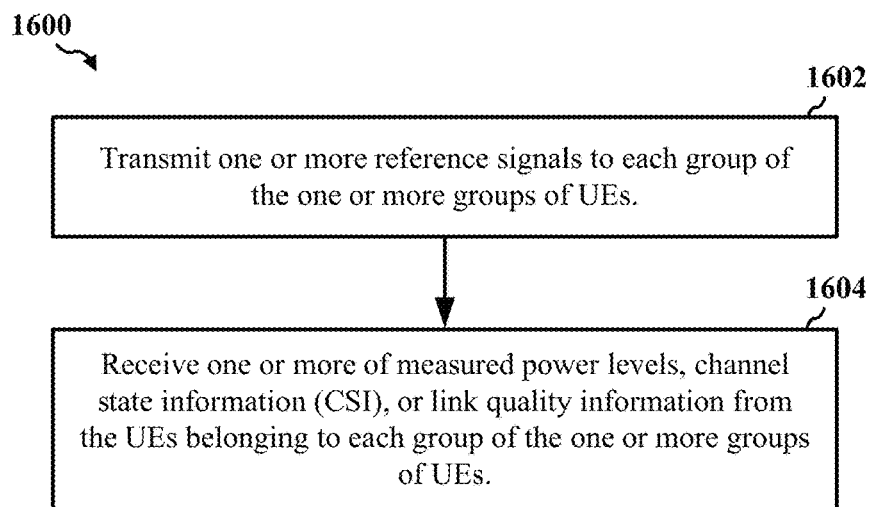
FIG. 16 shows a flowchart depicting an example operation for wireless communication that supports different DL transmit power levels according to some embodiments.

FIG. 16 shows a flowchart depicting an example operation 1600 for wireless communication that supports different DL transmit power levels. The operation 1600 may be performed by a wireless communication device such as one or more of the base stations 102 of FIG. 1, the base station 310 of FIG. 3, or the base station 502 of FIG. 5A. Although described with respect to the base station 502 of FIG. 5A, the operation 1600 may be performed by any suitable base station. In some instances, the operation 1600 may be performed prior to the operation 1200 of FIG. 12. For example, at block 1602, the base station may transmit one or more reference signals to each group of the one or more groups of UEs. At block 1604, the base station may receive one or more of measured power levels, channel state information (CSI), or link quality information from the UEs belonging to each group of the one or more groups of UEs. In some implementations, the base station may use one or more of the measured power levels, CSI, or link quality information provided by the UEs to divide the UEs into the plurality of groups.

Figure 17:
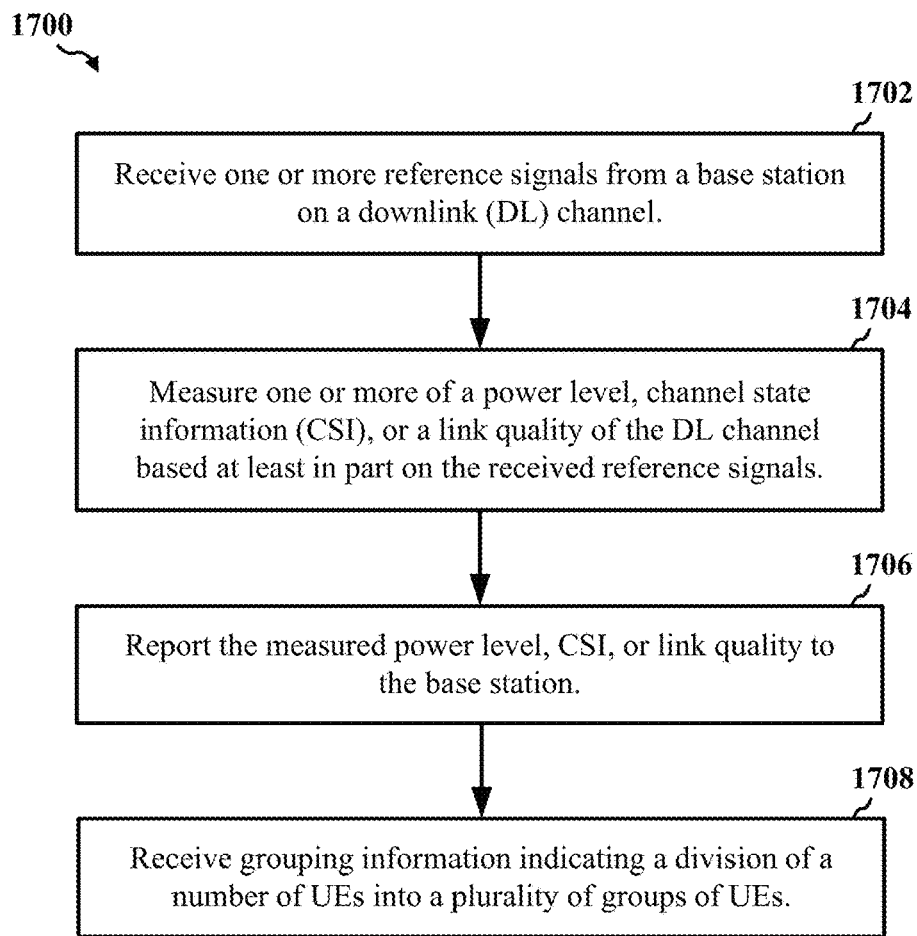
FIG. 17 shows a flowchart depicting an example operation for wireless communication that supports different DL transmit power levels according to some embodiments.

FIG. 17 shows a flowchart depicting an example operation 1700 for wireless communication that supports different DL transmit power levels. The operation 1700 may be performed by a wireless communication device such as one or more of the UEs 104 of FIG. 1, the UE 350 of FIG. 3, or the UE 504 of FIG. 5A. Although described with respect to the UE 504 of FIG. 5A, the operation 1700 may be performed by any suitable UE.

At block 1702, the UE receives one or more reference signals from a base station on a downlink (DL) channel. At block 1704, the UE measures one or more of a power level, channel state information (CSI), or a link quality of the DL channel based at least in part on the received reference signals. At block 1706, the UE reports the measured power level, CSI, or link quality to the base station. At block 1708, the UE receives grouping information indicating a division of a number of UEs into a plurality of groups of UEs. In some instances, the division of the number of UEs into the plurality of groups of UEs may be based at least in part on one or more of the measured power levels, CSI, or link qualities reported by the number of UEs.

The grouping information may indicate one or more of which group the UE belongs to, a transmit power level to be used for transmitting DL data to the group that the UE belongs to, a transmit power gradient indicating different DL transmit power levels associated with different groups of UEs, or a unique DL BWP allocated to the group that the UE belongs to. In some instances, the grouping information may be transmitted to the UE in a DCI message or a MAC-CE. In some other instances, the grouping information may be provided to the UE via RRC configuration.

In some implementations, the grouping information may indicate a first DL transmit power level to be used for transmitting DL data to a first group of UEs that includes the UE, and may indicate a second DL transmit power level to be used for transmitting DL data to another group of UEs, the second DL transmit power level different than the first DL transmit power level. The first DL transmit power level may be less than the second DL transmit power level, and at least some of the UEs belonging to the first group of UEs may be closer to the base station or may have smaller time advance (TA) values than UEs belonging to the second group of UEs. In some instances, the first DL transmit power level may be a transmit power level configured for DL transmissions from the base station by one or more releases of the 3GPP, and the second DL transmit power level may be an increased transmit power level relative to the configured transmit power level. In other instances, the second DL transmit power level may be a transmit power level configured for DL transmissions from the base station by one or more releases of the 3GPP, and the first DL transmit power level may be a reduced transmit power level relative to the configured transmit power level.

In some implementations, a difference between the first and second DL transmit power levels may be a configured power offset value. In some instances, the configured power offset value may be indicated to the UEs in a DCI message or a MAC-CE. In other instances, the configured power offset value may be indicated to the UEs via RRC configuration.

Figure 18:
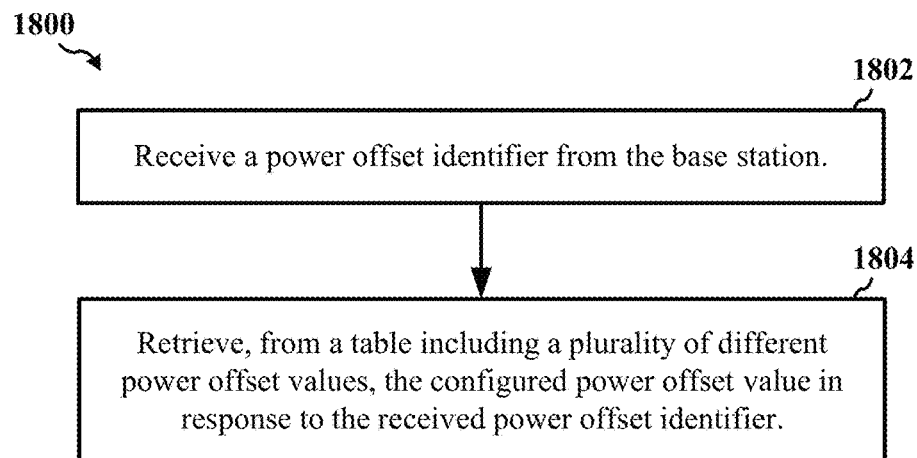
FIG. 18 shows a flowchart depicting an example operation for wireless communication that supports different DL transmit power levels according to some embodiments.

FIG. 18 shows a flowchart depicting an example operation 1800 for wireless communication that supports different DL transmit power levels. The operation 1800 may be performed by a wireless communication device such as one or more of the UEs 104 of FIG. 1, the UE 350 of FIG. 3, or the UE 504 of FIG. 5A. Although described with respect to the UE 504 of FIG. 5A, the operation 1800 may be performed by any suitable UE. In some implementations, the operation 1800 may be performed after the operation 1700 of FIG. 17. For example, after receiving grouping information from the base station, the UE may, at block 1802, may receive a power offset identifier from the base station. At block 1804, the UE may retrieve, from a table including a plurality of different power offset values, the configured power offset value in response to the received power offset identifier. In some instances, the table may be, or may include, the transmit power gradient determined by the base station. The table may be any suitable table (such as a look-up table), or may part of any suitable memory. In some instances, the transmit power gradient stored in the table may be provided to the UE via RRC configuration.

Figure 19:
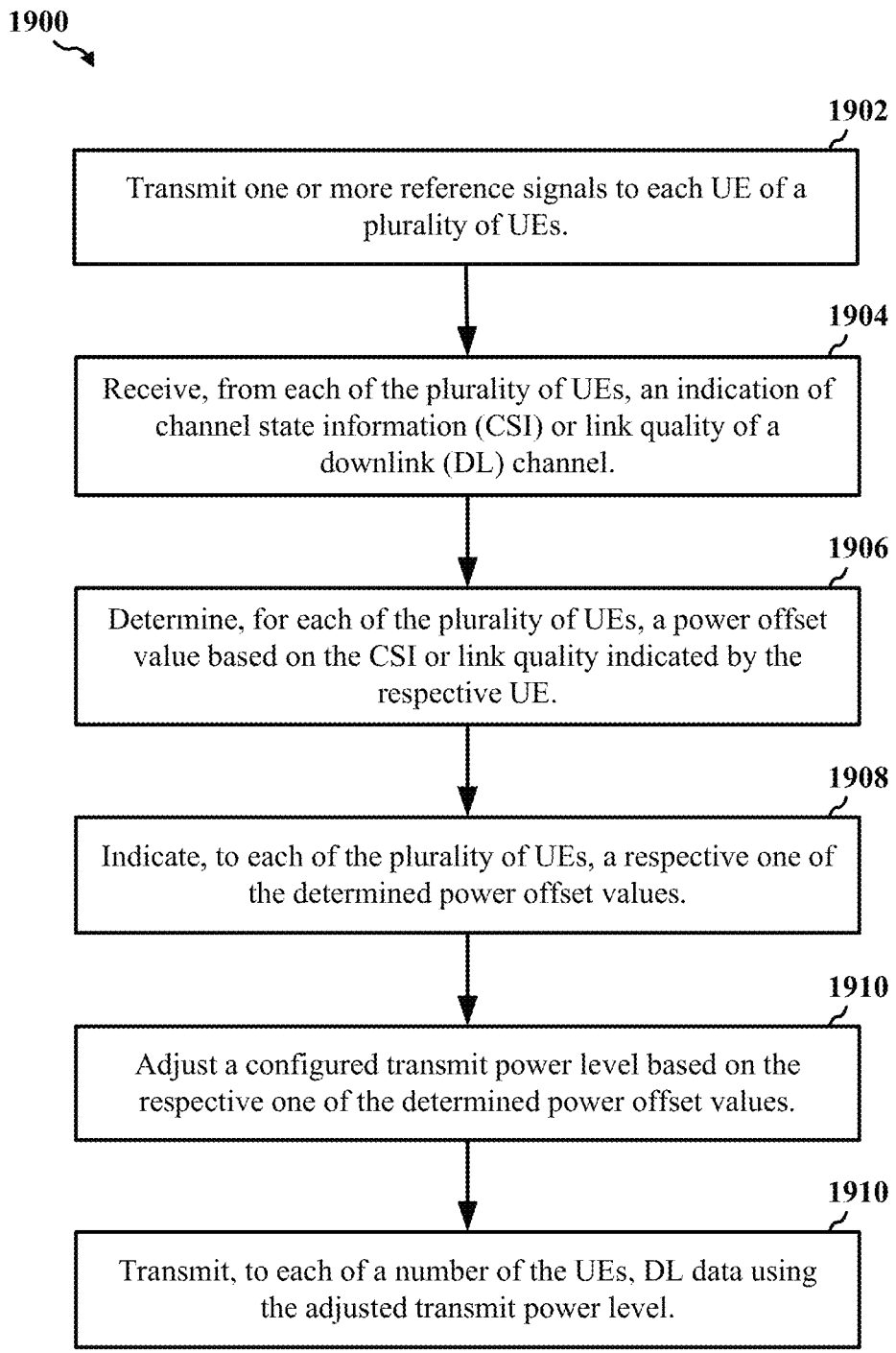
FIG. 19 shows a flowchart depicting an example operation for wireless communication that supports adjusting DL transmit power levels according to some embodiments.

FIG. 19 shows a flowchart depicting an example operation 1900 for wireless communication that supports adjusting DL transmit power levels. The operation 1900 may be performed by a wireless communication device such as one or more of the base stations 102 of FIG. 1, the base station 310 of FIG. 3, or the base station 602 of FIG. 6. Although described with respect to the base station 602 of FIG. 6, the operation 1900 may be performed by any suitable base station.

At block 1902, the base station transmits one or more reference signals to each UE of a plurality of UEs on a downlink (DL) channel. At block 1904, the base station receives, from each of the plurality of UEs, an indication of CSI or link quality of the DL channel. At block 1906, the base determines, for each of the plurality of UEs, a power offset value based on the CSI or link quality indicated by the respective UE. At block 1908, the base station indicates, to each of the plurality of UEs, a respective one of the determined power offset values. At block 1910, the base station adjusts a configured transmit power level based on the respective one of the determined power offset values. At block 1912, the base station transmits, to each of a number of the UEs, DL data using the adjusted DL transmit power level.

The one or more reference signals may be or may include any suitable reference signal from which a UE can determine CSI, channel conditions, or link quality. For example, in some instances, the reference signals may include one or more sets of channel state information reference signals (CSI-RSs), and the UE may determine the CSI or link quality of the DL channel based on the received CSI-RSs.

In some implementations, one or more of the power offset values may be a positive number, a negative number, or negative infinity. In other implementations, at least one of the power offset values may be a scalar. In some other implementations, at least one of the power offset values may be a vector. In some instances, the vector may include a plurality of offset values, and each offset value may indicate an amount by which the configured transmit power level is adjusted for DL transmissions across a respective one of a RE, a resource block (RB), or a resource block group (RBG). In some other instances, the vector may include different offset values applicable to different portions of a BWP. In some instances, the determined power offset values may be transmitted to the plurality of UEs in a DCI message or a MAC-CE. In other instances, the determined power offset values may be provided to the plurality of UEs via RRC configuration.

In some implementations, the configured transmit power level may be a power level specified by one or more releases of the Third Generation Partnership Project (3GPP), and the base station may determine the adjusted DL transmit power level by adding the respective power offset value to the configured transmit power level or by subtracting the respective power offset value from the configured transmit power level.

Figure 20A:
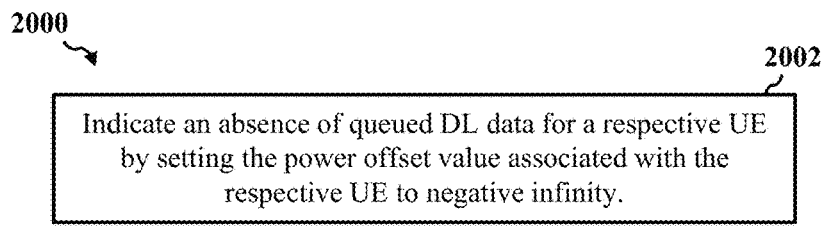
FIGS. 20A-20B show flowcharts depicting example operations for wireless communication that supports adjusting DL transmit power levels according to some embodiments.

FIG. 20A shows a flowchart depicting an example operation 2000 for wireless communication that supports adjusting DL transmit power levels. The operation 2000 may be performed by a wireless communication device such as one or more of the base stations 102 of FIG. 1, the base station 310 of FIG. 3, or the base station 602 of FIG. 4. Although described with respect to the base station 602 of FIG. 6, the operation 2000 may be performed by any suitable base station. In some implementations, the operation 2000 may be performed after the operation 1900 of FIG. 19. For example, at block 2002 the base station may, after transmitting the DL data, indicate an absence of queued DL data for a respective UE by setting the power offset value associated with the respective UE to negative infinity.

Figure 20B:
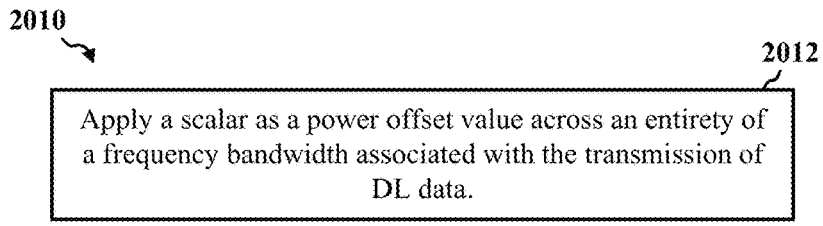

FIG. 20B shows a flowchart depicting an example operation 2010 for wireless communication that supports adjusting DL transmit power levels. The operation 2010 may be performed by a wireless communication device such as one or more of the base stations 102 of FIG. 1, the base station 310 of FIG. 3, or the base station 602 of FIG. 4. Although described with respect to the base station 602 of FIG. 6, the operation 2010 may be performed by any suitable base station. In some implementations, the operation 2010 may be performed after the operation 1900 of FIG. 19. For example, at block 2012 the base station may, after transmitting the DL data, apply a scalar as a power offset value across an entirety of a frequency bandwidth associated with the transmission of DL data.

Figure 21:
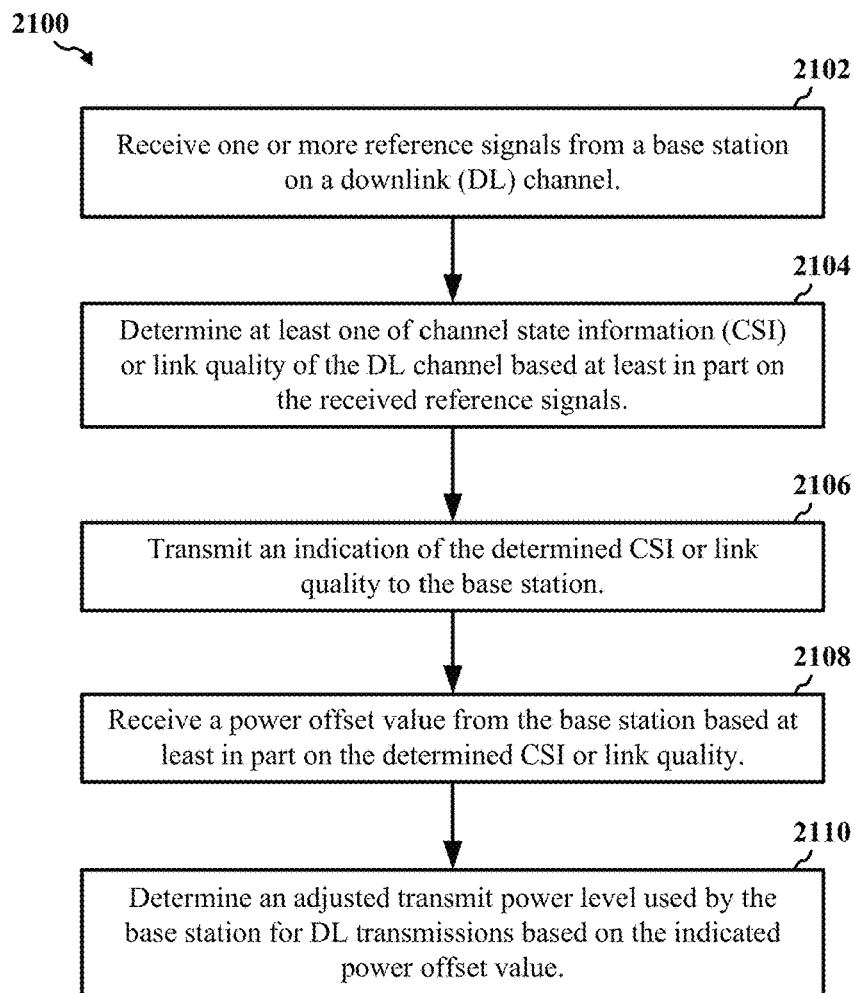
FIG. 21 shows a flowchart depicting an example operation for wireless communication that supports adjusting DL transmit power levels according to some embodiments.

FIG. 21 shows a flowchart depicting an example operation 2100 for wireless communication that supports adjusting DL transmit power levels. The operation 2100 may be performed by a wireless communication device such as the UE 104 of FIG. 1, the UE 350 of FIG. 3, or the UE 604 of FIG. 6. Although described with respect to the UE 604 of FIG. 6, the operation 2100 may be performed by any suitable UE.

At block 2102, the UE receives one or more reference signals from a base station on a DL channel. At block 2104, the UE determines at least one of CSI or a link quality of the DL channel based at least in part on the received reference signals. At block 2106, the UE transmits an indication of the determined CSI or link quality to the base station. At block 2108, the UE receives a power offset value from the base station based at least in part on the determined CSI or link quality. At block 2110, the UE determines an adjusted DL transmit power level used by the base station for DL transmissions based on the indicated power offset value.

The one or more reference signals may be or may include any suitable reference signal from which a UE can determine CSI, channel conditions, or link quality. For example, in some instances, the reference signals may include one or more sets of channel state information reference signals (CSI-RSs), and the UE may determine the CSI or link quality of the DL channel based on the received CSI-RSs.

In some implementations, one or more of the power offset values may be a positive number, a negative number, or negative infinity. In other implementations, at least one of the power offset values may be a scalar. In some other implementations, the power offset values may be included in a vector. For example, the vector may include a plurality of offset values, and each offset value may indicate an amount by which the configured transmit power level is adjusted for DL transmissions across a respective one of a RE, a resource block (RB), or a resource block group (RBG). In some instances, the vector may include different offset values applicable to different DL BWPs allocated to different group of UEs. In some other instances, the vector may include different offset values applicable to an entirety of the DL BWPs. In some instances, the determined power offset values may be received by the plurality of UEs in a DCI message or a MAC-CE. In other instances, the determined power offset values may be provided to the plurality of UEs via RRC configuration.

In some implementations, the configured transmit power level may be a power level specified by one or more releases of the 3GPP, and the UE may determine the adjusted transmit power level by adding the indicated power offset value to the configured transmit power level or by subtracting the indicated power offset value from the configured transmit power level.

Figure 22A:
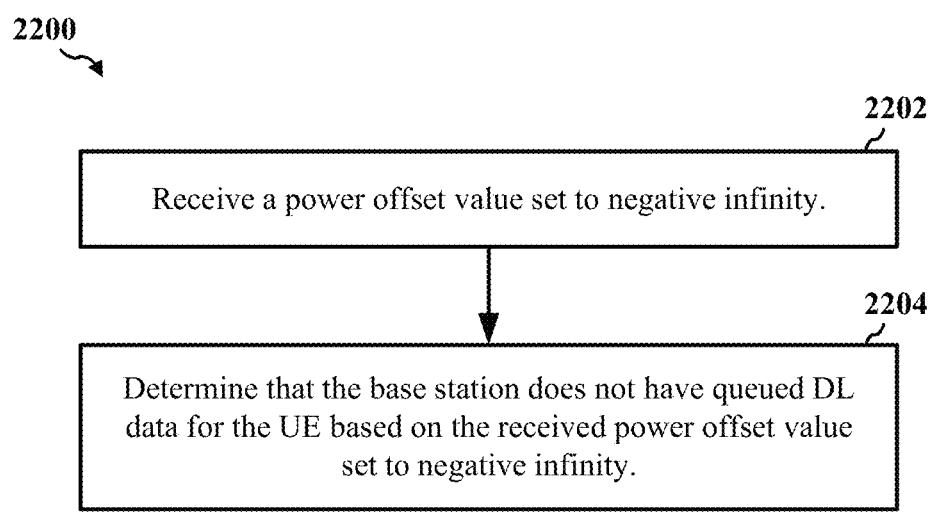
FIGS. 22A-22B show flowcharts depicting example operations for wireless communication that supports adjusting DL transmit power levels according to some embodiments.

FIG. 22A shows a flowchart depicting an example operation 2200 for wireless communication that supports adjusting DL transmit power levels. The operation 2200 may be performed by a UE such as the UE 104 of FIG. 1, the UE 350 of FIG. 3, or the UE 604 of FIG. 6. Although described with respect to the UE 604 of FIG. 6, the operation 2200 may be performed by any suitable UE. In some implementations, the operation 2200 may be performed after the operation 2100 of FIG. 21. For example, after determining the adjusted DL transmit power level used by the base station for DL transmissions, the UE may, at block 2202, receive a power offset value set to negative infinity. At block 2204, the UE may determine that the base station does not have queued DL data for the UE based on the received the power offset value set to negative infinity.

Figure 22B:
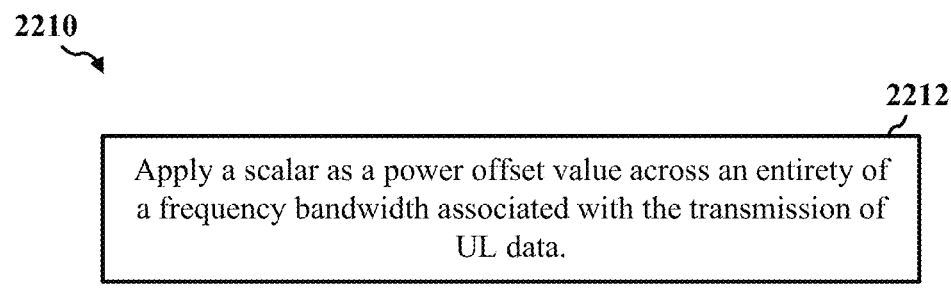

FIG. 22B shows a flowchart depicting an example operation 2210 for wireless communication that supports adjusting DL transmit power levels. The operation 2210 may be performed by a UE such as the UE 104 of FIG. 1, the UE 350 of FIG. 3, or the UE 604 of FIG. 6. Although described with respect to the UE 604 of FIG. 6, the operation 2210 may be performed by any suitable UE. In some implementations, the operation 2210 may be performed after the operation 2100 of FIG. 21. For example, after determining the adjusted DL transmit power level used by the base station for DL transmissions, the UE may, at block 2212, apply a scalar as a power offset value across an entirety of a frequency bandwidth associated with the transmission of DL data.

Figure 23:
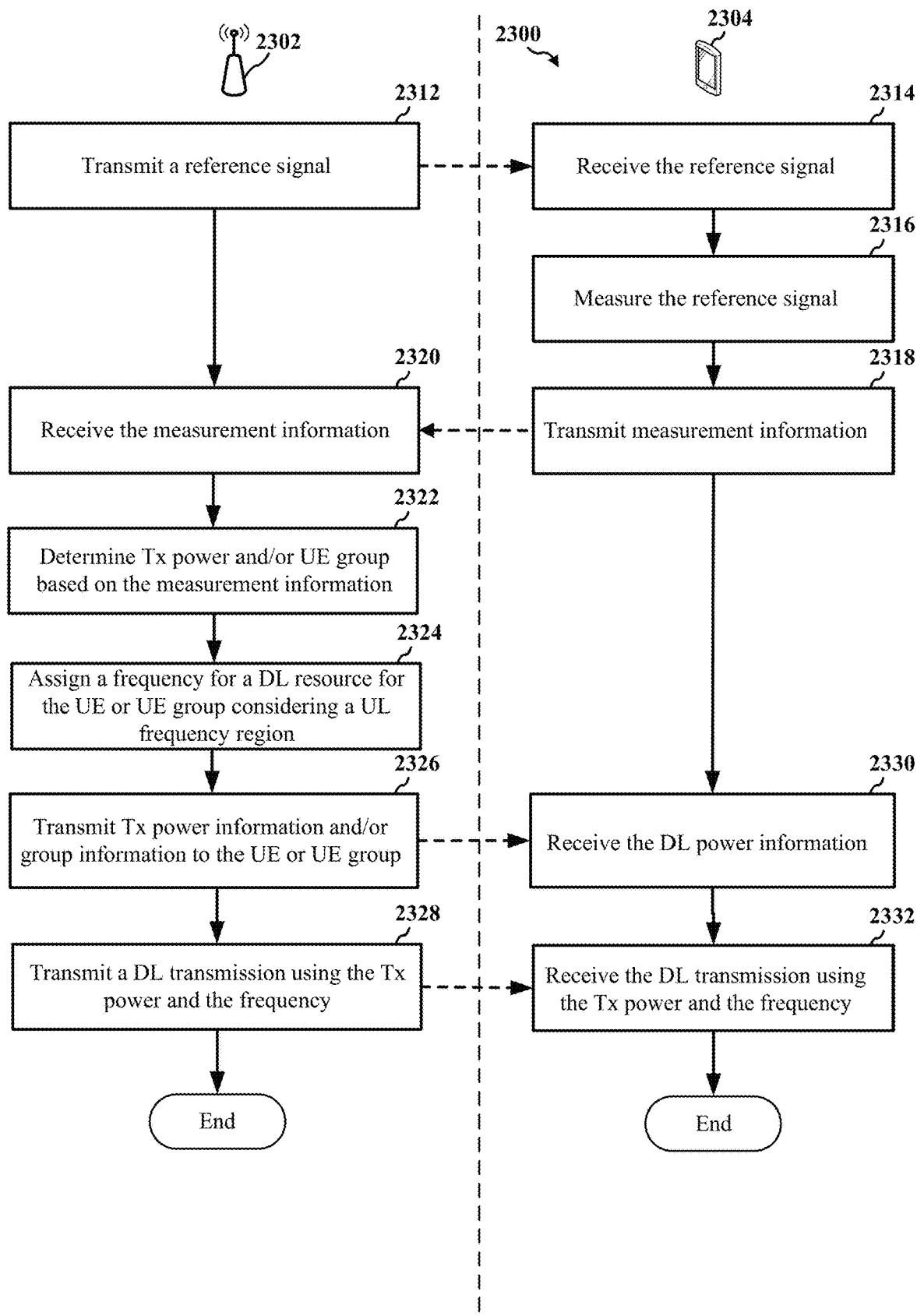
FIG. 23 shows a flowchart depicting an exemplary process for assigning a transmit power based on the frequency of the resource assignment according to some embodiments.

FIG. 23 shows a flowchart depicting an exemplary process 2300 for assigning a transmit power based on the frequency of the resource assignment in accordance with some aspects of the present disclosure. As described below, a particular implementation may omit some or all illustrated features, and may not require some illustrated features to implement all embodiments. The exemplary process 2300 may also be performed by a wireless communication device 2302 such as one or more of the base stations 102 of FIG. 1, the base station 310 of FIG. 3, or the base station 602 of FIG. 6. It should be appreciated that the process 2300 may be performed by any suitable base station or any suitable scheduling entity. The exemplary process 2300 may be performed by a UE 2304 such as the UE 104 of FIG. 1, the UE 350 of FIG. 3, or the UE 604 of FIG. 6. However, it should be appreciated that the process 2300 may be performed by any suitable UE or any suitable scheduled entity.

In some examples, a base station 2302 may assign a transmit (Tx) power for a given DL resource assignment based on a frequency of the resource assignment. In further examples, the base station 2302 may assign a Tx power for a given DL resource assignment based on a frequency separation of a frequency of the resource assignment, and a UL frequency region (e.g., active UL BWP, PUSCH, etc.) of a carrier. Thus, the base station 2302 may reduce interference to or from UL communications that use the UL frequency region, by assigning a higher Tx power for DL transmissions that are farther in frequency from the UL frequency region, and a lower Tx power for DL transmissions that are closer in frequency from the UL frequency region. In some examples, the base station 2302 may transmit DL transmissions using different Tx powers depending on characteristics of UEs or groups of UEs. Thus, the base station 2302 may save transmission power while groups of UEs 2304 may receive good quality DL signals from the base station 2302. The flow chart in FIG. 23 and its description below may show one or more examples of this implementation.

At block 2312, the base station 2302 may transmit (e.g., via transmitter 318TX) a reference signal to the UE 2304. In some examples, the reference signal may include a channel state information (CSI) reference signal (CSI-RS), a demodulation reference signal (DM-RS), a path loss reference signal (PLRS), a positioning reference signal (PRS), a phase-tracking reference signal (PT-RS), a beam measurement reference signal (BRS), a synchronization signal (SS), a beam refinement reference signal (BRRS), or any other suitable reference signal.

At block 2314, the UE 2304 may receive (e.g., via the receiver 354RX) the reference signal from the base station 2302.

At block 2316, the UE 2304 may measure one or more of a power level, CSI, or link quality of a DL channel of the reference signal. In some examples, the UE 2304 may use the reference signal to measure a DL signal strength. In some examples, the UE 2304 may measure a received signal strength indicator (RSSI), reference signal received power (RSRP), and/or energy per resource element (EPRE) of the reference signal. For example, the UE 2304 may measure an RSSI of the SSB, an EPRE of the CSI-RS, or an EPRE of the DM-RS. In other examples, the UE 2304 may use the reference signal (e.g., PLRS) to measure a path-loss level. It should be appreciated that measurements of a reference signal are not limited to the examples above. The UE 2304 may use any reference signal to generate any suitable measurement for determining Tx powers and/or UE groups. For example, the UE may measure channel state information (CSI) or link quality of a reference signal.

At block 2318, the UE 2304 may report information about one or more measurements to the base station 2302. In some examples, the UE 2304 may transmit UE location information and/or measurement information about one or more of the measured DL signal strength/power level, the pass-loss level, CSI, link quality of the DL channel.

At block 2320, the base station 2302 may receive measurement information from the UE 2304, such as one or more of the measured DL signal strength, the path-loss level, CSI, or link quality of the DL channel. In some examples, the measured DL signal strength may include the RSSI, RSRP, and/or EPRE of the reference signal.

In some examples, the base station 2302 may additionally or alternatively measure a UL signal received from the UE 2304. Any suitable measurement or characterization of a UL signal or channel may be utilized within the scope of this disclosure, including but not limited to measurement of a UL received signal power. Here, the UL signal may include the report or measurement information from the UE 2304, described above in relation to block 2318. In some examples, the base station 2302 may measure a timing advance (TA) value of the UE 2304 based on a UL signal including the report from the UE 2304. In some examples, the base station 2302 may receive the UE's location based on the UE's report. In other examples, the base station 2302 may measure the UE's location based on techniques such as roundtrip time (RTT), angle of arrival/departure (AoA/AoD), or time difference of arrival (TDOA) using the PRS.

At block 2322, the base station 2302 may determine a DL transmit (Tx) power for a DL transmission to the UE 2304 based on the report or measurement information from the UE 2304. The Tx power associated with the UE 2304 may be different from another Tx power associated with another UE. That is, the base station 2302 may transmit DL signals using various powers to a plurality of UEs 2304 based on channel characteristics of or parameters associated with the respective UEs 2304. In some examples, the base station 2302 may determine UE groups corresponding to various Tx powers. Thus, UEs in a particular UE group may receive and successfully decode DL data using a Tx power that is different from another Tx power associated with UEs in another UE group. Thus, the base station 2302 may transmit signals using various Tx powers corresponding to the UE groups.

In some examples, the base station 2302 may determine a Tx power for a DL transmission based on a TA value of a corresponding UE. For example, the base station 2302 may determine a TA value of a first UE and another TA value of a second UE. The TA value of the first UE may be shorter than another TA value of the second UE. The base station 2302 may thus determine a first Tx power for a DL signal to the first UE and a second Tx power for another DL signal to the second UE. In some examples, the first Tx power may be less than the second Tx power. It should be appreciated that the base station 2302 may determine groups and Tx powers based on TA values of corresponding UEs and at least one predetermined TA value (e.g., a threshold TA value). For example, the base station 2302 may determine Group 1, Group 2, Group 3, and Group N based on N−1 predetermined TA values. Each group may include one or more UEs. The base station may determine Group 1 based on predetermined TA value 1, Group 2 based on predetermined TA value 1 and predetermined TA value 2, and Group N based on predetermined TA value N−1. Thus, UEs in Group 1 may have TA values shorter than UEs in Group 2. UEs in Group 2 may have TA values not shorter than UEs in Group 1 and shorter than UEs in Group 3. UEs in Group N may have TA values not shorter than UEs in Group N−1. Accordingly, the base station 2302 may determine a Tx power for a particular DL resource assignment based on a determination of the corresponding group of the UE receiving the resource assignment. In the example above, the base station 2302 may determine Tx power 1 corresponding to Group 1, Tx power 2 corresponding to Group 2, Tx power 3 corresponding to Group 3, and Tx power N corresponding to Group N. Tx power 1 is less than Tx power 2, which is less than Tx power 3, which is less than Tx power N.

In some examples, the base station 2302 may determine a Tx power for a DL transmission based on a location of a corresponding UE. For example, the base station 2302 may determine that a first UE 2304 is closer to the base station 2302 than a second UE 2304. The base station 2302 may also determine a first Tx power for a DL signal to the first UE and a second Tx power for another DL signal to the second UE. In some examples, the first Tx power may be less than the second Tx power. It should be appreciated that the base station 2302 may determine groups and Tx powers based on locations of corresponding UEs and at least one predetermined distance (e.g., a threshold distance) to the base station 2302. For example, the base station may determine Group 1, Group 2, Group 3, and Group N based on N−1 predetermined distances to the base station 2302. Each group may include one or more UEs. The base station 2302 may determine Group 1 based on predetermined distance 1, Group 2 based on predetermined distance 1 and predetermined distance 2, and Group N based on predetermined distance N−1. Thus, UEs in Group 1 may be closer to the base station 2302 than UEs in Group 2. UEs in Group 2 may not be closer to the base station 2302 than UEs in Group 1, and may be closer than UEs in Group 3. UEs in Group N may not be closer to the base station 2302 than UEs in Group N−1. The base station 2302 may determine a Tx power for a particular DL resource assignment based on a determination of the corresponding group of the UE receiving the resource assignment. In the example above, the base station 2302 may determine Tx power 1 corresponding to Group 1, Tx power 2 corresponding to Group 2, Tx power 3 corresponding to Group 3, and Tx power N corresponding to Group N. Tx power 1 is less than Tx power 2, which is less than Tx power 3, which is less than Tx power N.

In some examples, the base station 2302 may determine a Tx power for a DL transmission based on a UL power of a signal from a UE 2304 to the base station 2302. For example, the base station 2302 may measure a UL power of a signal from a first UE and another UL power of a signal from a second UE. The UL power of the first UE may be less than another UL power of the second UE. The base station 2302 may also determine a first Tx power for a DL signal to the first UE and a second Tx power for another DL signal to the second UE. In some examples, the first Tx power may be more than the second Tx power. It should be appreciated that the base station 2302 may determine groups and Tx powers based on UL powers of signals from UEs 2304 to the base station 2302 and at least one predetermined UL power (e.g., a threshold UL power). For example, the base station may determine Group 1, Group 2, Group 3, and Group N based on N−1 predetermined UL powers. Each group may include one or more UEs. The base station 2302 may determine Group 1 based on predetermined UL power 1, Group 2 based on predetermined UL power 1 and predetermined UL power 2, and Group N based on predetermined UL power N−1. Thus, UEs in Group 1 may have UL power less than UEs in Group 2. UEs in Group 2 may have UL powers not less than UEs in Group 1 and less than UEs in Group 3. UEs in Group N may have UL powers not less than UEs in Group N−1. Accordingly, the base station 2302 may determine a Tx power for a particular DL resource assignment based on a determination of the corresponding group of the UE receiving the resource assignment. In the example above, the base station 2302 may determine Tx power 1 corresponding to Group 1, Tx power 2 corresponding to Group 2, Tx power 3 corresponding to Group 3, and Tx power N corresponding to Group N. Tx power 1 may be greater than Tx power 2, which may be greater than Tx power 3, which may be greater than Tx power N.

In some examples, the base station 2302 may determine a Tx power for a DL transmission based on a path-loss level corresponding to the UEs 2304. For example, the base station 2302 may determine a path-loss level for a first UE and another path-loss level for a second UE. The path-loss level for the first UE may be lower than another path-loss level for the second UE. The base station 2302 may thus determine a first Tx power for a DL signal to the first UE and the second Tx power for another DL signal to the second UE. In some examples, the first Tx power may be less than the second Tx power. It should be appreciated that the base station 2302 may determine groups and Tx powers based on path-loss levels corresponding to the UEs 2304 and at least one predetermined path-loss level (e.g., a threshold path-loss level). For example, the base station may determine Group 1, Group 2, Group 3, and Group N based on N−1 predetermined path-loss levels. Each group may include one or more UEs. For example, the base station may determine Group 1 based on predetermined path-loss level 1, Group 2 based on predetermined path-loss level 1 and predetermined path-loss level 2, and Group N based on predetermined path-loss level N−1. Thus, UEs in Group 1 may have path-loss levels lower than UEs in Group 2. UEs in Group 2 may have path-loss levels not lower than UEs in Group 1 and less than UEs in Group 3. UEs in Group N may have path-loss levels not lower than UEs in Group N−1. Accordingly, the base station 2302 may determine a Tx power for a particular DL resource assignment based on a determination of the corresponding group of the UE receiving the resource assignment. In the example above, the base station 2302 may determine Tx power 1 corresponding to Group 1, Tx power 2 corresponding to Group 2, Tx power 3 corresponding to Group 3, and Tx power N corresponding to Group N. Tx power 1 is less than Tx power 2, which is less than Tx power 3, which is less than Tx power N.

In some examples, the base station 2302 may determine a Tx power based on a DL signal strength of the reference signals at a UE. The DL signal strength may include, but is not limited to, one or more of an RSSI, RSRP, or EPRE of a reference signal. For example, the base station 2302 may determine a first DL signal strength measured by a first UE and a second DL signal strength measured by a second UE. The first UE may have less DL signal strength than another DL signal strength of the second UE. The base station 2302 may thus determine a first Tx power for a DL signal to the first UE and a second Tx power for another DL signal to the second UE. In some examples, the first Tx power may be more than the second Tx power. It should be appreciated that the base station 2302 may determine a group and/or a Tx power for a particular UE based on a DL signal strength of the reference signals at the UE and at least one predetermined DL signal strength (e.g., a threshold signal strength). For example, the base station 2302 may determine Group 1, Group 2, Group 3, and Group N based on N−1 predetermined DL signal strengths. Each group may include one or more UEs. The base station may determine Group 1 based on predetermined DL signal strength 1, Group 2 based on predetermined DL signal strength 1 and predetermined DL signal strength 2, and Group N based on predetermined DL signal strength N−1. Thus, UEs in Group 1 may have DL signal strengths less than UEs in Group 2. UEs in Group 2 may have DL signal strengths not less than UEs in Group 1 and less than UEs in Group 3. UEs in Group N may have DL signal strengths not less than UEs in Group N−1. Accordingly, the base station 2302 may determine a Tx power for a particular DL resource assignment based on a determination of the corresponding group of the UE receiving the resource assignment. In the example above, the base station 2302 may determine Tx power 1 corresponding to Group 1, Tx power 2 corresponding to Group 2, Tx power 3 corresponding to Group 3, and Tx power N corresponding to Group N. Tx power 1 may be more than Tx power 2, which may be more than Tx power 3, which may be more than Tx power N.

At block 2324, the base station 2302 may assign a frequency for a DL resource assignment for the corresponding UE or UE group to mitigate inter-channel interference (ICI) with UL communication using a UL frequency region of the carrier. In some examples, a DL transmission using a DL resource for a corresponding UE or UE group may use a low Tx power at frequencies close to a UL frequency region. Another DL transmission using another DL resource for a corresponding UE or UE group may use a high Tx power at frequencies far away from the UL frequency region.

In some examples, the base station 2302 may transmit a resource assignment to a first UE to grant to the first UE a first DL resource for a first DL transmission on a carrier. The first DL resource may be at a first frequency. The first DL resource at the first frequency may correspond to the first UE 2304 or a first group of a plurality of groups. The first UE 2304 or the first group may correspond to a first Tx power for the first DL transmission. The first group of UEs may include the first UE 2304. One or more UEs in the first group may exploit resources at the first frequency. In addition, the base station 2302 may transmit a resource assignment to a second UE to grant to the second UE a second DL resource for a second DL transmission on the carrier. The second DL resource may be at a second frequency. The second DL resource at the second frequency may correspond to the second UE 2304 or a second group of a plurality of groups. The second UE 2304 or the second group may correspond to a second Tx power for the second DL transmission. The second group of UEs may include the second UE 2304. One or more UEs in the second group may exploit resources at the second frequency. The base station 2302 may also transmit a third resource assignment for UL communication on a resource at a UL frequency region.

The base station 2302 may determine a first transmit (Tx) power for a first DL transmission to the first UE on the first DL resource at the first frequency. The first Tx power may have a power level configured based on a separation or difference between the first frequency for the first DL resource and an uplink (UL) frequency region of the carrier. The base station 2302 may also determine a second transmit (Tx) power for a second DL transmission to the second UE on the second DL resource at the second frequency. The second Tx power may have a power level configured based on a separation or difference between the second frequency for the second DL resource and the UL frequency region of the carrier. The second Tx power may differ from the first Tx power based on a frequency difference or offset between the second DL resource and the first DL resource. In some examples (e.g., FIG. 5B), the first Tx power may be less than the second Tx power, and a first DL resource on the first frequency (e.g., DL BWP1 (541)) may be assigned closer in frequency to a portion of the UL frequency region (e.g., UL BWP (PUSCH) (520)) than a second DL resource on the second frequency (e.g., DL BWP2 (542)). In other examples (e.g., FIG. 5C), a first frequency difference, separation, or range (e.g., guard band (538)) between the first frequency (e.g., DL BWP (PDSCH) (536)) and the UL frequency region (e.g., UL BWP (PUSCH) (532)) may have a narrower width in frequency than a second frequency distance, separation, or range (e.g., guard band (548)) between the second frequency (e.g., DL BWP (PDSCH) (544)) and the UL frequency region (e.g., UL BWP (PUSCH) (542)). In some examples, the first and/or second frequency ranges may be or may include guard bands. Examples of the DL resource may include a resource block, a subcarrier, a frequency spectrum (channel or carrier), a time slot or subframe of a TDD/FDD component carrier, a spreading code, a precoder, and/or other resources commonly used for DL transmissions.

In some examples, a first Tx power of DL transmissions to the first UE or the first group may be less than a second Tx power of DL transmissions to the second UE or the second group. That is, the first UE or a UE in the first group may have a shorter TA value than a TA value of the second UE or a UE in the second group. In some examples, the first UE or a UE in the first group may be closer to the base station 2302 than the second UE or a UE in the second group to the base station 2302. In some examples, the base station 2302 may measure a greater received UL signal power for the first UE or a UE in the first group than a received UL signal power for the second UE or a UE in the second group. In some examples, the first UE or a UE in the first group may have a lower path-loss level than the second UE or a UE in the second group. In some examples, the first UE or a UE in the first group may report a greater received DL signal strength than the second UE or a UE in the second group. In some examples, the base station 2302 may assign a first DL resource at the first frequency, which is associated with a low Tx power, closer in time or frequency to a portion of a resource at the UL frequency region than a second DL resource at the second frequency, which is associated with a high Tx power. Thus, the base station 2302 may assign resources for DL transmissions using a low Tx power at frequencies close to a UL frequency region, and assign resources for other DL transmissions using a high Tx power at frequencies farther away from the UL frequency region, to reduce interference. Thus, the base station 2302 may configure a power level of a Tx power corresponding to a DL resource at a frequency based on a difference or separation between the frequency for the DL resource and a UL frequency region of a carrier.

At block 2326, the base station 2302 may transmit, to the UE 2304, an indication of the Tx power for a DL transmission to the UE 2304. In some examples, the base station 2302 may transmit grouping information to the UE 2304 to inform a UE of a group assignment, and/or the Tx power indication, if the base station 2302 determines groups of UEs 2304. In some examples, the base station 2302 may transmit, to the UE 2304, the Tx power indication or grouping information in a DCI message, a MAC-CE message, or an RRC message. In some examples, the base station 2302 may transmit the Tx power indication and/or grouping information on resources at the assigned frequency.

In some examples, the base station 2302 may transmit a power weight for the UE 2304 to determine a Tx power for a DL transmission. The power weight may include a power offset value. The power offset value may indicate a difference between a predetermined or configured Tx power for DL transmissions and an adjusted Tx power. The configured Tx power may be a regular or legacy Tx power of the base station 2302 that the base station 2302 may have used for DL transmissions without providing the Tx power level to the UE 2304. In some examples, the configured power may be a power level established by one or more specifications published by the 3GPP. However, the power weight is not limited to a power offset value. It may be any value for a UE to determine the Tx power the base station may use to transmit a DL signal to the UE 2304.

At block 2330, the UE 2304 may receive the indication of the Tx power and/or the grouping information. Based on the Tx power indication and/or the grouping information, the UE 2304 may determine the Tx power to be used for a DL transmission from the base station 2302. In some examples, the UE 2304 may receive the power weight. The UE 2304 may determine the Tx power to be transmitted from the base station 2302 based on the power weight.

At block 2328, the base station 2302 may transmit, to the UE 2304, a DL transmission using the Tx power associated with the UE or UE's group of a plurality of groups. The DL transmission may include at least one of control information, user data, or a reference signal. In some examples, the Tx power associated with the UE or UE's group may be different from another Tx power associated with another UE or another group of the plurality of groups.

At block 2332, the UE 2304 may receive the DL transmission transmitted with the Tx power associated with the UE or UE's group. In some examples, the Tx power associated with the UE's group may be different from another Tx power associated with another UE or another group of the plurality of groups.

In some examples, the base station 2302 may provide a general Tx power indication or general grouping information to the UE 2304 before the base station determines the Tx power and/or UE's group to the UE 2304 as shown in FIGS. 4A and 4B. The base station 2302 may also provide the general Tx power indication or the general grouping information at any suitable time. The general Tx power indication or the general grouping information may include Tx powers for DL transmissions and/or corresponding UE groups. The general Tx power information or the general grouping information may further include one or more parameters to define the various Tx powers and/or UE groups. In some examples, the parameter may include at least one of: at least one predetermined distance to the base station 2302, at least one predetermined path-loss level, or at least one predetermined DL signal strength. It should be appreciated that the base station 2302 may transmit any other suitable parameters to define the Tx powers or UE groups. Based on the general Tx power indication or the general grouping information, the UE 2304 may determine the Tx power and/or UE's group along with UE's measurements of a reference signal from the base station 2302. Then, the UE 2304 may explicitly transmit UE's group information to the base station 2302. In some examples, the UE 2304 may determine UE's group and a Tx power for a DL transmission from the base station 2302 and may transmit measurement information. The measurement information may be about one or more of the measured DL signal strength/power level, the pass-loss level, UE's location, CSI, link quality of the DL channel. The base station 2302 may determine UE's group and a Tx power for a DL transmission to the UE 2304 based on the measurement information.

Further Examples Having a Variety of Features

Example 1: A method of wireless communication operable at a base station, the method comprising: transmitting, to a first user equipment (UE), an indication of a first transmit (Tx) power for a first downlink (DL) transmission on a first DL resource on a carrier, the first DL resource being at a first frequency, the first Tx power having a power level configured based on a difference between the first frequency for the first DL resource and an uplink (UL) frequency region of the carrier; and transmitting the first DL transmission using the first frequency and the first Tx power.

Example 2: The method of Example 1, further comprising: transmitting, to a second UE, an indication of a second Tx power for a second DL transmission on a second DL resource on the carrier, the second DL resource being at a second frequency, the second Tx power having a power level configured based on a difference between the second frequency for the second DL resource and the UL frequency region of the carrier, wherein the second Tx power differs from the first Tx power based on a frequency difference between the second DL resource and the first DL resource.

Example 3: The method of Example 2, wherein a first timing advance (TA) value corresponding to the first UE is shorter than a second TA value corresponding to the second UE, and wherein the power level of the first Tx power is lower than the power level of the second Tx power.

Example 4: The method of Example 2, wherein a first location of the first UE is closer to the base station than a second location of the second UE, and wherein the power level of the first Tx power is lower than the power level of the second Tx power.

Example 5: The method of Example 2, wherein a first UL power corresponding to a first signal from the first UE is less than a second UL power corresponding to a second signal from the second UE, and wherein the power level of the first Tx power is higher than the power level of the second Tx power.

Example 6: The method of Example 2, wherein a first path-loss level corresponding to a first signal from the first UE is lower than a second path-loss level corresponding to a second signal from the second UE, and wherein the power level of the first Tx power is lower than the power level of the second Tx power.

Example 7: The method of Example 2, wherein a first signal strength corresponding to a first signal from the first UE is less than a second signal strength corresponding to a second signal from the second UE, and wherein the power level of the first Tx power is higher than the power level of the second Tx power.

Example 8: The method of Example 2, wherein a UL resource on the UL frequency region is assigned in frequency between the first frequency and the second frequency.

Example 9: The method of Example 2, wherein the power level of the first Tx power is less than the power level of the second Tx power, and wherein the first DL resource at the first frequency is closer in frequency to the UL frequency region than the second DL resource at the second frequency to the UL frequency region.

Example 10: The method of Example 2, wherein the power level of the first Tx power is less than the power level of the second Tx power, and wherein a first frequency range between the first frequency and the UL frequency region is narrower than a second frequency range between the second frequency and the UL frequency region.

Example 11: The method of Example 10, wherein the first frequency range is a first guard band, and wherein the second frequency range is a second guard band.

Example 12: A base station configured for wireless communication, comprising: a processor; a transceiver communicatively coupled to the processor; and a memory communicatively coupled to the processor, wherein the processor and the memory are configured to: transmit, to a first user equipment (UE), an indication of a first transmit (Tx) power for a first downlink (DL) transmission on a first DL resource on a carrier, the first DL resource being at a first frequency, the first Tx power having a power level configured based on a difference between the first frequency for the first DL resource and an uplink (UL) frequency region of the carrier; and transmit the first DL transmission using the first frequency and the first Tx power.

Example 13: The base station of Example 12, wherein the processor and the memory are further configured to: transmit, to a second UE, an indication of a second Tx power for a second DL transmission on a second DL resource on the carrier, the second DL resource being at a second frequency, the second Tx power having a power level configured based on a difference between the second frequency for the second DL resource and the UL frequency region of the carrier, wherein the second Tx power differs from the first Tx power based on a frequency difference between the second DL resource and the first DL resource.

Example 14: The base station of Example 13, wherein a first timing advance (TA) value corresponding to the first UE is shorter than a second TA value corresponding to the second UE, and wherein the power level of the first Tx power is lower than the power level of the second Tx power.

Example 15: The base station of Example 13, wherein a UL resource on the UL frequency region is assigned in frequency between the first frequency and the second frequency.

Example 16: The base station of Example 13, wherein the power level of the first Tx power is less than the power level of the second Tx power, and wherein the first DL resource at the first frequency is closer in frequency to the UL frequency region than the second DL resource at the second frequency to the UL frequency region.

Example 17: The base station of Example 13, wherein the power level of the first Tx power is less than the power level of the second Tx power, and wherein a first frequency range between the first frequency and the UL frequency region is narrower than a second frequency range between the second frequency and the UL frequency region.

Example 18: The base station of Example 17, wherein the first frequency range is a first guard band, and wherein the second frequency range is a second guard band.

Example 19: A non-transitory computer-readable medium storing computer executable code, comprising code for causing a base station to: transmit, to a first user equipment (UE), an indication of a first transmit (Tx) power for a first downlink (DL) transmission on a first DL resource on a carrier, the first DL resource being at a first frequency, the first Tx power having a power level configured based on a difference between the first frequency for the first DL resource and an uplink (UL) frequency region of the carrier; and transmit the first DL transmission using the first frequency and the first Tx power.

Example 20: The non-transitory computer-readable medium of Example 19, wherein the code for causing the base station further to: transmit, to a second UE, an indication of a second Tx power for a second DL transmission on a second DL resource on the carrier, the second DL resource being at a second frequency, the second Tx power having a power level configured based on a difference between the second frequency for the second DL resource and the UL frequency region of the carrier, wherein the second Tx power differs from the first Tx power based on a frequency difference between the second DL resource and the first DL resource.

Example 21: The non-transitory computer-readable medium of Example 20, wherein a UL resource on the UL frequency region is assigned in frequency between the first frequency and the second frequency.

Example 22: The non-transitory computer-readable medium of Example 20, wherein the power level of the first Tx power is less than the power level of the second Tx power, and wherein the first DL resource at the first frequency is closer in frequency to the UL frequency region than the second DL resource at the second frequency to the UL frequency region.

Example 23: The non-transitory computer-readable medium of Example 20, wherein the power level of the first Tx power is less than the power level of the second Tx power, and wherein a first frequency range between the first frequency and the UL frequency region is narrower than a second frequency range between the second frequency and the UL frequency region.

Example 24: The non-transitory computer-readable medium of Example 23, wherein the first frequency range is a first guard band, and wherein the second frequency range is a second guard band.

Example 25: A base station for wireless communication, comprising: means for transmitting, to a first user equipment (UE), an indication of a first transmit (Tx) power for a first downlink (DL) transmission on a first DL resource on a carrier, the first DL resource being at a first frequency, the first Tx power having a power level configured based on a difference between the first frequency for the first DL resource and an uplink (UL) frequency region of the carrier; and means for transmitting the first DL transmission using the first frequency and the first Tx power.

Example 26: The base station of Example 25, further comprising: means for transmitting, to a second UE, an indication of a second Tx power for a second DL transmission on a second DL resource on the carrier, the second DL resource being at a second frequency, the second Tx power having a power level configured based on a difference between the second frequency for the second DL resource and the UL frequency region of the carrier, wherein the second Tx power differs from the first Tx power based on a frequency difference between the second DL resource and the first DL resource.

Example 27: The base station of Example 26, wherein a UL resource on the UL frequency region is assigned in frequency between the first frequency and the second frequency.

Example 28: The base station of Example 26, wherein the power level of the first Tx power is less than the power level of the second Tx power, and wherein the first DL resource at the first frequency is closer in frequency to the UL frequency region than the second DL resource at the second frequency to the UL frequency region.

Example 29: The base station of Example 26, wherein the power level of the first Tx power is less than the power level of the second Tx power, and wherein a first frequency range between the first frequency and the UL frequency region is narrower than a second frequency range between the second frequency and the UL frequency region.

Example 30: The base station of Example 29, wherein the first frequency range is a first guard band, and wherein the second frequency range is a second guard band.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various illustrative logics, logical blocks, modules, circuits and algorithm processes described in connection with the implementations disclosed herein may be implemented as electronic hardware, computer software, or combinations of both. The interchangeability of hardware and software has been described generally, in terms of functionality, and illustrated in the various illustrative components, blocks, modules, circuits and processes described above. Whether such functionality is implemented in hardware or software depends upon the particular application and design constraints imposed on the overall system.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, or, any conventional processor, controller, microcontroller, or state machine. A processor also may be implemented as a combination of computing devices (such as a combination of a DSP and a microprocessor), a plurality of microprocessors, one or more microprocessors in conjunction with a DSP core, or any other such configuration. In some implementations, particular processes and methods may be performed by circuitry that is specific to a given function.

In one or more aspects, the functions described may be implemented in hardware, digital electronic circuitry, computer software, firmware, including the structures disclosed in this specification and their structural equivalents thereof, or in any combination thereof. Implementations of the subject matter described in this specification also can be implemented as one or more computer programs, i.e., one or more modules of computer program instructions, encoded on a computer storage media for execution by, or to control the operation of, data processing apparatus.

If implemented in software, the functions may be stored on or transmitted over as one or more instructions or code on a computer-readable medium. The processes of a method or algorithm disclosed herein may be implemented in a processor-executable software module which may reside on a computer-readable medium. Computer-readable media includes both computer storage media and communication media including any medium that can be enabled to transfer a computer program from one place to another. A storage media may be any available media that may be accessed by a computer. By way of example, and not limitation, such computer-readable media may include RAM, ROM, EEPROM, CD-ROM or other optical disk storage, magnetic disk storage or other magnetic storage devices, or any other medium that may be used to store desired program code in the form of instructions or data structures and that may be accessed by a computer. Also, any connection can be properly termed a computer-readable medium. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and instructions on a machine readable medium and computer-readable medium, which may be incorporated into a computer program product.

Various modifications to the implementations described in this disclosure may be readily apparent to those skilled in the art, and the generic principles defined herein may be applied to other implementations without departing from the spirit or scope of this disclosure. Thus, the claims are not intended to be limited to the implementations shown herein, but are to be accorded the widest scope consistent with this disclosure, the principles and the novel features disclosed herein.

What is claimed is:

1. A method of wireless communication operable at a base station, the method comprising:
   transmitting, to a first user equipment (UE), an indication of a first transmit (Tx) power for a first downlink (DL) transmission on a first DL resource on a carrier, the first DL resource being at a first frequency, the first Tx power having a power level configured based on an additive difference between the first frequency for the first DL resource and an uplink (UL) frequency region of the carrier; and
   transmitting the first DL transmission using the first frequency and the first Tx power.

2. The method of claim 1, further comprising:
   transmitting, to a second UE, an indication of a second Tx power for a second DL transmission on a second DL resource on the carrier, the second DL resource being at a second frequency, the second Tx power having a power level configured based on an additive difference between the second frequency for the second DL resource and the UL frequency region of the carrier,
   wherein the second Tx power differs from the first Tx power based on a frequency difference between the second DL resource and the first DL resource.

3. The method of claim 2, wherein a first timing advance (TA) value corresponding to the first UE is shorter than a second TA value corresponding to the second UE, and
   wherein the power level of the first Tx power is lower than the power level of the second Tx power.

4. The method of claim 2, wherein a first location of the first UE is closer to the base station than a second location of the second UE, and
   wherein the power level of the first Tx power is lower than the power level of the second Tx power.

5. The method of claim 2, wherein a first UL power corresponding to a first signal from the first UE is less than a second UL power corresponding to a second signal from the second UE, and
   wherein the power level of the first Tx power is higher than the power level of the second Tx power.

6. The method of claim 2, wherein a first path-loss level corresponding to a first signal from the first UE is lower than a second path-loss level corresponding to a second signal from the second UE, and
   wherein the power level of the first Tx power is lower than the power level of the second Tx power.

7. The method of claim 2, wherein a first signal strength corresponding to a first signal from the first UE is less than a second signal strength corresponding to a second signal from the second UE, and
   wherein the power level of the first Tx power is higher than the power level of the second Tx power.

8. The method of claim 2, wherein a UL resource on the UL frequency region is assigned in frequency between the first frequency and the second frequency.

9. The method of claim 2, wherein the power level of the first Tx power is less than the power level of the second Tx power, and
    wherein the first DL resource at the first frequency is closer in frequency to the UL frequency region than the second DL resource at the second frequency to the UL frequency region.

10. The method of claim 2, wherein the power level of the first Tx power is less than the power level of the second Tx power, and
    wherein a first frequency range between the first frequency and the UL frequency region is narrower than a second frequency range between the second frequency and the UL frequency region.

11. The method of claim 10, wherein the first frequency range is a first guard band, and
    wherein the second frequency range is a second guard band.

12. A base station configured for wireless communication, comprising:
    a processor;
    a transceiver communicatively coupled to the processor; and
    a memory communicatively coupled to the processor,
    wherein the processor and the memory are configured to:
        transmit, to a first user equipment (UE), an indication of a first transmit (Tx) power for a first downlink (DL) transmission on a first DL resource on a carrier, the first DL resource being at a first frequency, the first Tx power having a power level configured based on an additive difference between the first frequency for the first DL resource and an uplink (UL) frequency region of the carrier; and
        transmit the first DL transmission using the first frequency and the first Tx power.

13. The base station of claim 12, wherein the processor and the memory are further configured to:
    transmit, to a second UE, an indication of a second Tx power for a second DL transmission on a second DL resource on the carrier, the second DL resource being at a second frequency, the second Tx power having a power level configured based on an additive difference between the second frequency for the second DL resource and the UL frequency region of the carrier,
    wherein the second Tx power differs from the first Tx power based on a frequency difference between the second DL resource and the first DL resource.

14. The base station of claim 13, wherein a first timing advance (TA) value corresponding to the first UE is shorter than a second TA value corresponding to the second UE, and
    wherein the power level of the first Tx power is lower than the power level of the second Tx power.

15. The base station of claim 13, wherein a UL resource on the UL frequency region is assigned in frequency between the first frequency and the second frequency.

16. The base station of claim 13, wherein the power level of the first Tx power is less than the power level of the second Tx power, and
    wherein the first DL resource at the first frequency is closer in frequency to the UL frequency region than the second DL resource at the second frequency to the UL frequency region.

17. The base station of claim 13, wherein the power level of the first Tx power is less than the power level of the second Tx power, and
    wherein a first frequency range between the first frequency and the UL frequency region is narrower than a second frequency range between the second frequency and the UL frequency region.

18. The base station of claim 17, wherein the first frequency range is a first guard band, and
    wherein the second frequency range is a second guard band.

19. A non-transitory computer-readable medium storing computer executable code, comprising code for causing a base station to:
    transmit, to a first user equipment (UE), an indication of a first transmit (Tx) power for a first downlink (DL) transmission on a first DL resource on a carrier, the first DL resource being at a first frequency, the first Tx power having a power level configured based on an additive difference between the first frequency for the first DL resource and an uplink (UL) frequency region of the carrier; and
    transmit the first DL transmission using the first frequency and the first Tx power.

20. The non-transitory computer-readable medium of claim 19, wherein the code for causing the base station further to:
    transmit, to a second UE, an indication of a second Tx power for a second DL transmission on a second DL resource on the carrier, the second DL resource being at a second frequency, the second Tx power having a power level configured based on an additive difference between the second frequency for the second DL resource and the UL frequency region of the carrier,
    wherein the second Tx power differs from the first Tx power based on a frequency difference between the second DL resource and the first DL resource.

21. The non-transitory computer-readable medium of claim 20, wherein a UL resource on the UL frequency region is assigned in frequency between the first frequency and the second frequency.

22. The non-transitory computer-readable medium of claim 20, wherein the power level of the first Tx power is less than the power level of the second Tx power, and
    wherein the first DL resource at the first frequency is closer in frequency to the UL frequency region than the second DL resource at the second frequency to the UL frequency region.

23. The non-transitory computer-readable medium of claim 20, wherein the power level of the first Tx power is less than the power level of the second Tx power, and
    wherein a first frequency range between the first frequency and the UL frequency region is narrower than a second frequency range between the second frequency and the UL frequency region.

24. The non-transitory computer-readable medium of claim 23, wherein the first frequency range is a first guard band, and
    wherein the second frequency range is a second guard band.

25. A base station for wireless communication, comprising:
    means for transmitting, to a first user equipment (UE), an indication of a first transmit (Tx) power for a first downlink (DL) transmission on a first DL resource on a carrier, the first DL resource being at a first frequency, the first Tx power having a power level configured based on an additive difference between the first frequency for the first DL resource and an uplink (UL) frequency region of the carrier; and
    means for transmitting the first DL transmission using the first frequency and the first Tx power.

26. The base station of claim 25, further comprising:
means for transmitting, to a second UE, an indication of a second Tx power for a second DL transmission on a second DL resource on the carrier, the second DL resource being at a second frequency, the second Tx power having a power level configured based on an additive difference between the second frequency for the second DL resource and the UL frequency region of the carrier,
wherein the second Tx power differs from the first Tx power based on a frequency difference between the second DL resource and the first DL resource.

27. The base station of claim 26, wherein a UL resource on the UL frequency region is assigned in frequency between the first frequency and the second frequency.

28. The base station of claim 26, wherein the power level of the first Tx power is less than the power level of the second Tx power, and
wherein the first DL resource at the first frequency is closer in frequency to the UL frequency region than the second DL resource at the second frequency to the UL frequency region.

29. The base station of claim 26, wherein the power level of the first Tx power is less than the power level of the second Tx power, and
wherein a first frequency range between the first frequency and the UL frequency region is narrower than a second frequency range between the second frequency and the UL frequency region.

30. The base station of claim 29, wherein the first frequency range is a first guard band, and
wherein the second frequency range is a second guard band.

* * * * *